United States Patent
Colacecchi

(10) Patent No.: US 10,231,563 B2
(45) Date of Patent: Mar. 19, 2019

(54) INTEGRATED CURTAIN SYSTEM AND METHOD

(71) Applicant: The Boeing Company, Chicago, IL (US)

(72) Inventor: Jay Colacecchi, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 848 days.

(21) Appl. No.: 14/794,638

(22) Filed: Jul. 8, 2015

(65) Prior Publication Data

US 2017/0009504 A1   Jan. 12, 2017

(51) Int. Cl.
   *A47H 1/04*   (2006.01)
   *B64D 11/00*  (2006.01)

(52) U.S. Cl.
   CPC ........... *A47H 1/04* (2013.01); *B64D 11/0023* (2013.01); *A47H 2201/00* (2013.01)

(58) Field of Classification Search
   CPC ............... A47H 1/04; A47H 2001/045; A47H 2001/047; A47H 2201/00; B64D 11/00; B64D 11/0023; E05D 15/0608; E05D 15/0613; E05D 15/0626; Y10T 16/35; Y10T 16/376; Y10T 16/379
   USPC ............ 244/118.5; 160/118, 196.1, 201, 330
   See application file for complete search history.

(56) References Cited

U.S. PATENT DOCUMENTS

| | | | | | |
|---|---|---|---|---|---|
| 1,889,112 | A | * | 11/1932 | Shoemaker | E05D 15/0613 105/155 |
| 2,706,306 | A | * | 4/1955 | Sheetz | A47H 1/02 16/94 D |
| 2,710,731 | A | * | 6/1955 | Bright | B64D 11/0023 105/323 |
| 3,206,791 | A | * | 9/1965 | Weber | A47H 1/04 16/96 D |
| 3,331,095 | A | * | 7/1967 | Hachtel | A47H 1/04 16/96 D |
| 3,491,400 | A | * | 1/1970 | Hubbard | E06B 3/924 16/96 R |
| 3,823,439 | A | * | 7/1974 | Selset | A47H 1/08 16/87.2 |
| 4,047,262 | A | * | 9/1977 | Izawa | A47H 1/04 16/93 D |

(Continued)

OTHER PUBLICATIONS

Aerscreen, "Reinforced Laminate", retrieved Jun. 25, 2015.

(Continued)

*Primary Examiner* — Richard R. Green
*Assistant Examiner* — Brady W Frazier

(57) ABSTRACT

A curtain system may include a track system configured to be mounted to an interior structure of a vehicle. The track system may include three or more track sections oriented in at least two different directions. Each track section may be configured to support at least one curtain suspended from and slidable along the track sections. The track system may include at least one junction fitting interconnecting three or more track sections and allowing movement of a curtain from one of the three or more track sections to either one of two or more other track sections of the three or more track sections. In this regard, the junction fitting and the track sections may define different curtain paths for the curtain.

20 Claims, 18 Drawing Sheets

(56) References Cited

U.S. PATENT DOCUMENTS

| | | | | |
|---|---|---|---|---|
| 4,569,164 | A | * | 2/1986 | Dickson .............. E05D 15/0608 160/196.1 |
| 5,016,318 | A | * | 5/1991 | Harris ................. E05D 15/0608 16/94 R |
| 5,816,534 | A | * | 10/1998 | Schumacher ...... B64D 11/0023 244/119 |
| 6,481,359 | B1 | * | 11/2002 | Owens ................ E05D 15/0608 104/103 |
| 8,123,165 | B2 | * | 2/2012 | Breuer ..................... B60P 3/36 244/118.5 |
| 8,869,865 | B2 | | 10/2014 | Roach |
| 2003/0070363 | A1 | * | 4/2003 | Bakalar .............. E05D 15/0613 49/409 |
| 2011/0042434 | A1 | * | 2/2011 | Warner ............. B64D 11/0023 224/401 |
| 2012/0043028 | A1 | * | 2/2012 | Roach ................ B64D 11/0023 160/84.06 |
| 2014/0158310 | A1 | * | 6/2014 | Slyter ................ B64D 11/0023 160/124 |

OTHER PUBLICATIONS eTrailer.com, "Stromberg Carlson Extend-A-Shower Shower Curtain Rod for RVs," retrieved Apr. 1, 2015.

Ritehite, "SCH Heavy-Duty Sliding Curtain Walls," retrieved Apr. 1, 2015.

Hospital Curtains, "Modern Hospital Curtains," retrieved Apr. 1, 2015.

IEN, "Curtain Walls: Controlling Dust, Fumes, and Humidity," retrieved Apr. 1, 2015.

* cited by examiner

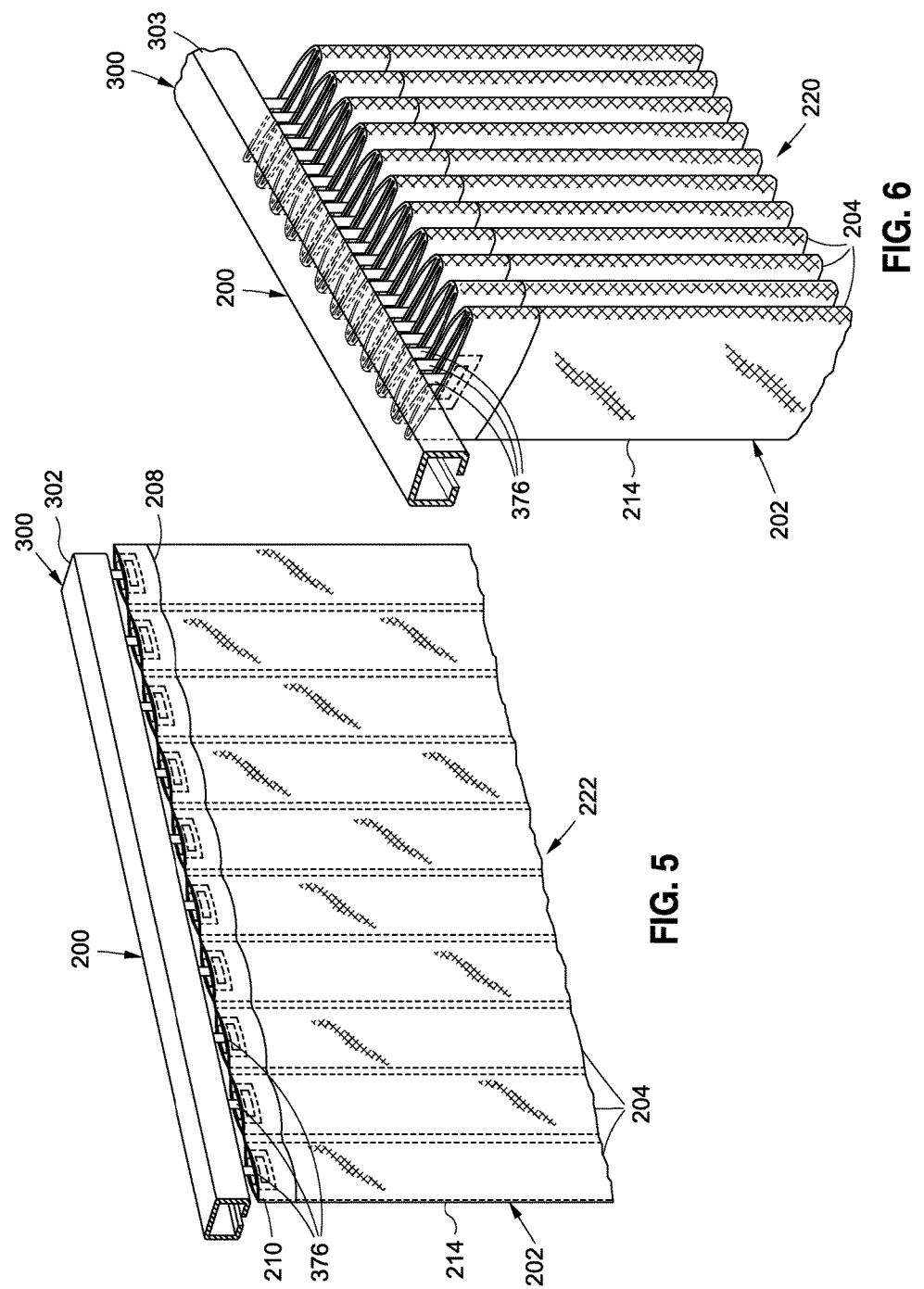

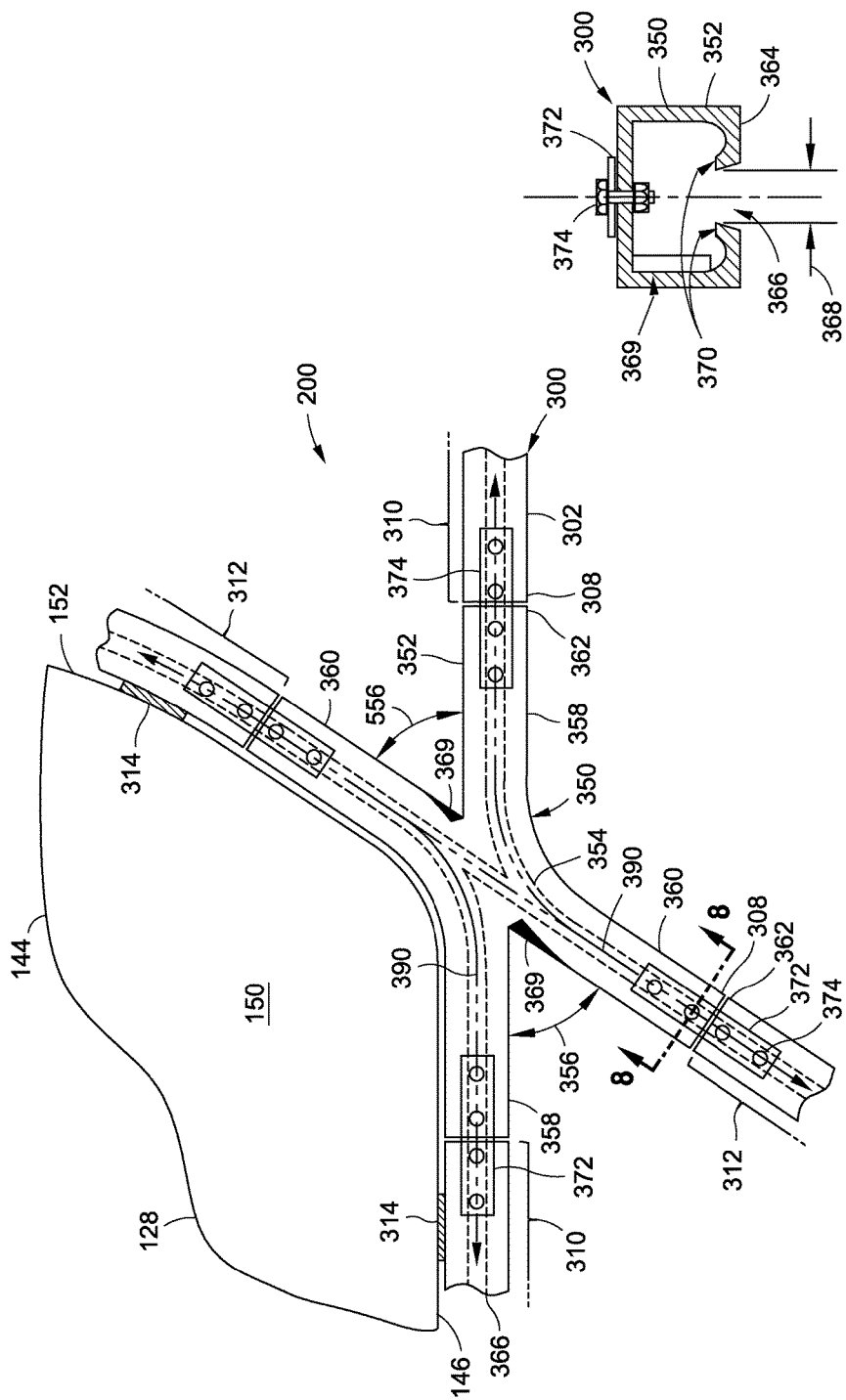

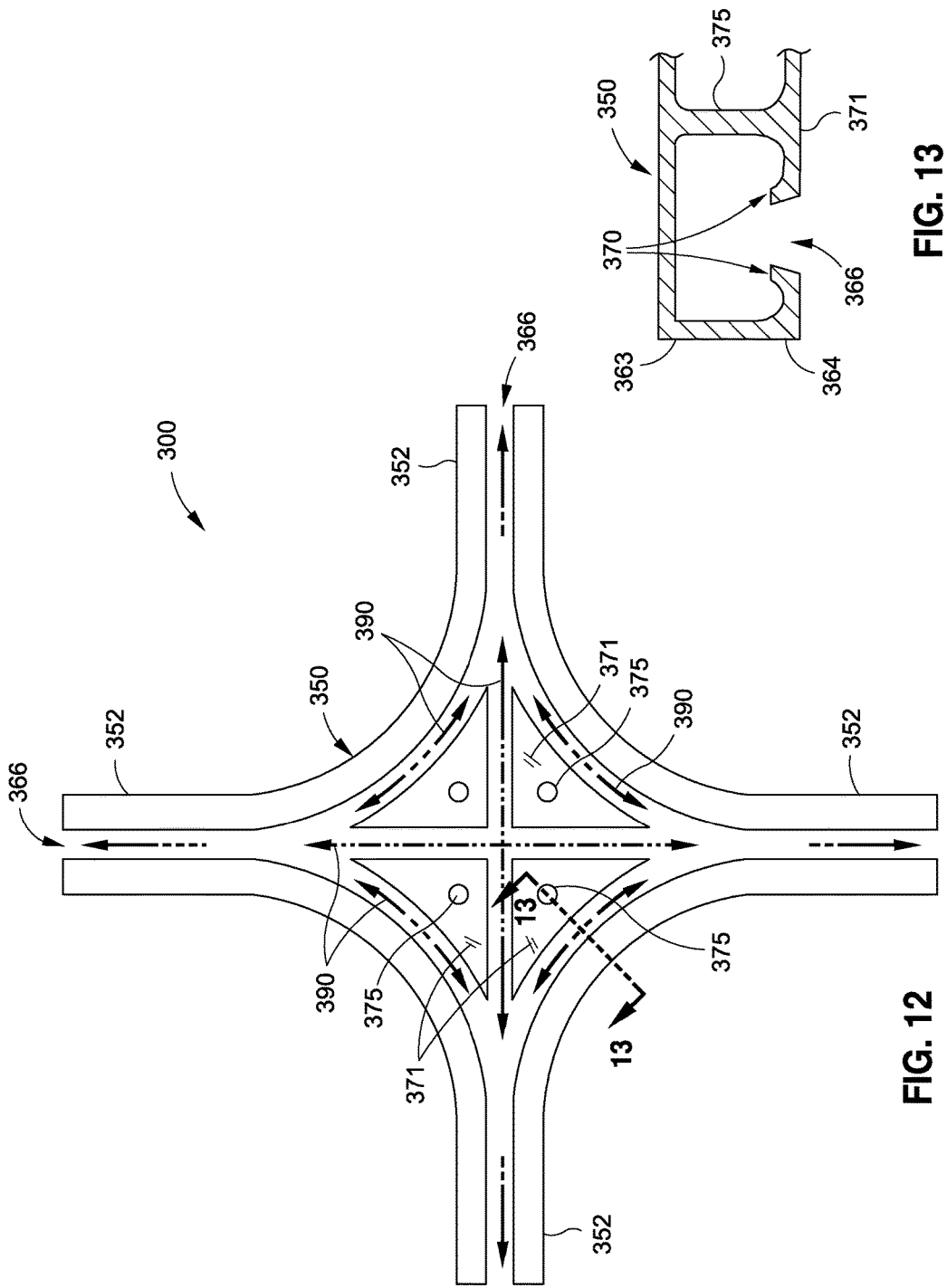

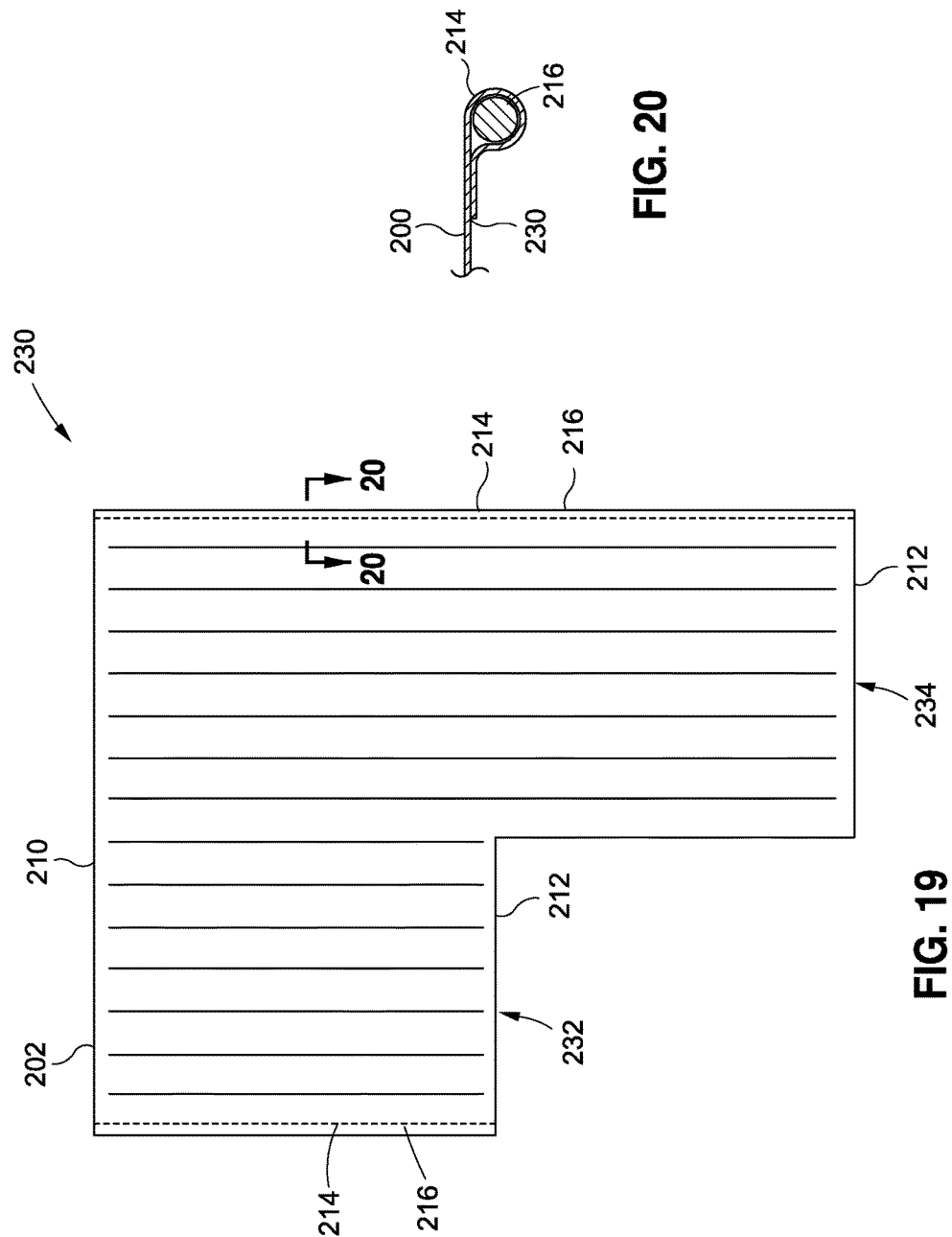

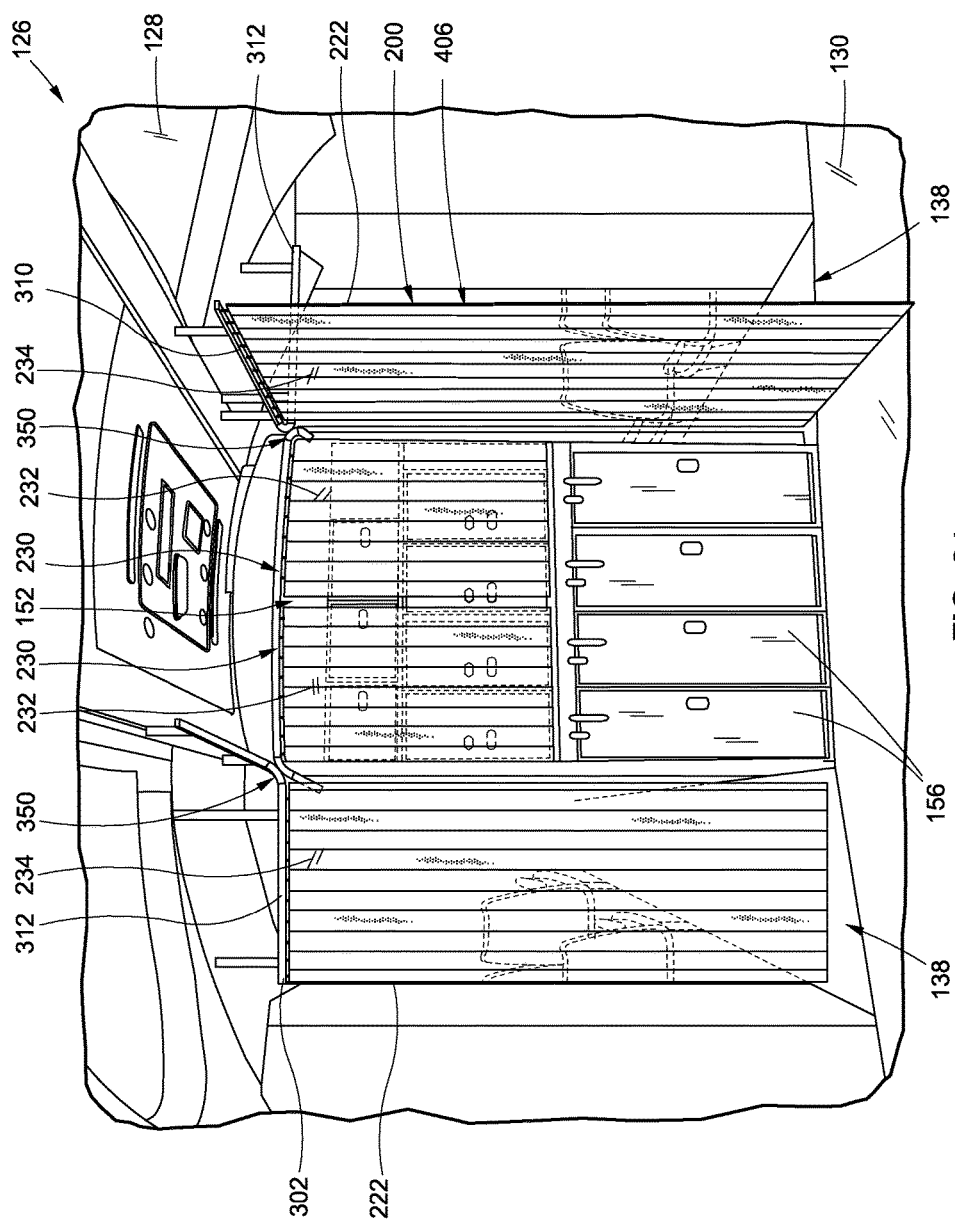

INTEGRATED CURTAIN SYSTEM AND METHOD

The present disclosure relates generally to curtain systems and, more particularly, to a curtain system and method of use in a vehicle interior.

BACKGROUND

Commercial aircraft typically include a galley in the passenger cabin for in-flight meal preparation for passengers and crew. Conventional galleys may include a retractable pull-down screen to cover the working face of the galley during certain phases of aircraft operation. For example, during boarding of passengers, the pull-down screen may cover various inserts such as a coffeemaker, oven, and freezer occupying the galley working face, and thereby allow the airline to present an aesthetically-pleasing appearance for the boarding passengers.

Unfortunately, such pull-down screens are typically mounted to a decorative header on top of the galley working face necessitating the removal of the pull-down screen to gain access to galley equipment for service or maintenance. In some cases, the galley pull-down screens must also be removed to gain access to galley equipment installed in the cabin ceiling above the galley. The need to remove the galley pull-down screens adds to the turn-around time required to prepare the aircraft for flight. A further drawback associated with galley pull-down screens is that such screens are prone to creasing, tears, and other types of damage over time.

As can be seen, there exists a need in the art for a system and method for temporarily covering the working face of an aircraft galley and which avoids the above-mentioned drawbacks associated with conventional galley pull-down screens.

SUMMARY

The above-noted needs associated with temporarily covering the working face of a galley are specifically addressed and alleviated by the present disclosure which provides a track system configured to be mounted to an interior structure of a vehicle. The track system may include three or more track sections oriented in at least two different directions. Each track section may be configured to support at least one curtain suspended from and slidable along the track sections. The track system may include at least one junction fitting interconnecting three or more track sections and allowing movement of a curtain from one of the three or more track sections to either one of two or more other track sections of the three or more track sections. In this regard, the junction fitting and the track sections may define different curtain paths for the curtain.

Also disclosed is an aircraft having a fuselage including an aircraft cabin. The aircraft cabin may include an interior structure having at least one curtain. The aircraft may additionally include a track system that may be mounted to the interior structure and which may include three or more track sections oriented in at least two different directions with each track section supporting a curtain suspended from and slidable along the track sections. The track system may additionally include a junction fitting interconnecting the three or more track sections and allowing movement of the curtain from one of the three or more track sections to either one of two or more other track sections of the three or more track sections. As mentioned above, the junction fitting and the track sections may define different curtain paths for the curtain.

Also disclosed is a method of arranging curtains in a vehicle interior. The method may include supporting a curtain on at least one of three or more track sections of a track system interconnected by a junction fitting. As mentioned above, the track system may be mounted to an interior structure of a vehicle. The method may further include moving the curtain from one of the three or more track sections and across the junction fitting to either one of two or more other track sections of the three or more track sections.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a perspective view of an example of a curtain in a deployed configuration;

FIG. 6 is a perspective view of an example of a curtain in a stowed configuration;

FIG. 7 is a magnified plan view of a portion of the track system taken along line 7 of FIG. 4 and illustrating the different curtain paths defined by the track sections interconnected by the junction fitting;

FIG. 8 is a sectional view taken of an example of a junction fitting taken along line 8 of FIG. 7;

FIG. 12 is a sectional plan view of a further example of a junction fitting defining multiple curtain paths;

FIG. 13 is a sectional view taken along line 13 of FIG. 12 and illustrating a track portion of the junction fitting coupled to a top portion of the junction fitting by a connecting rod;

FIG. 19 is a side view of an example of a graduated-length curtain having a partial-length portion and a full-length portion;

FIG. 20 is a sectional view of the graduated-length curtain taken along line 20 of FIG. 19 and illustrating a stiffening element included in a curtain side edge;

FIG. 21 is a perspective view of an example of a curtain system including two graduated-length curtains;

DETAILED DESCRIPTION

Figure 1:
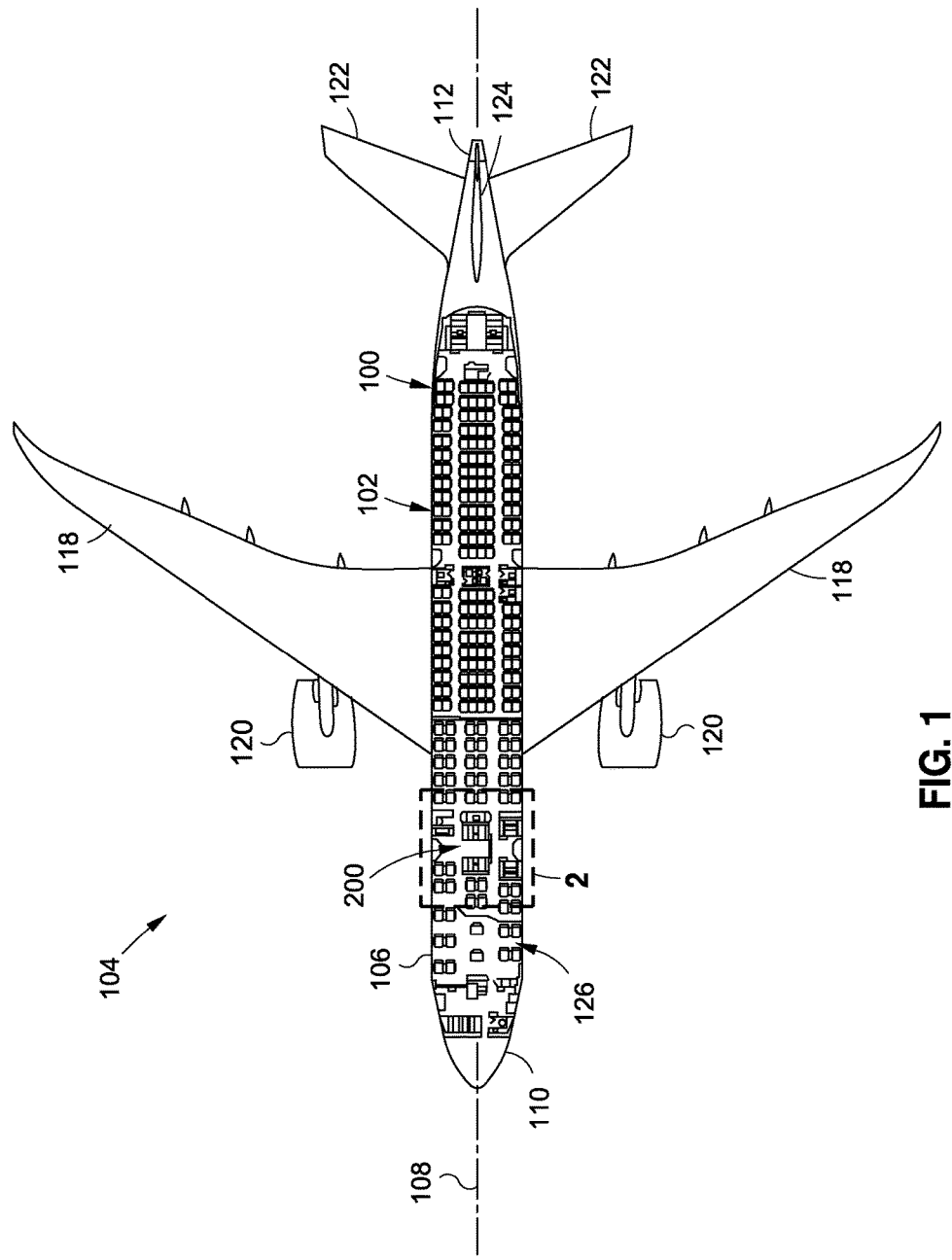
FIG. 1 is a plan view of an aircraft having an aircraft cabin.

Referring now to the drawings wherein the showings illustrate various embodiments of the present disclosure, shown in FIG. 1 is a plan view of an aircraft 104 having an aircraft cabin 126 that may incorporate one or more examples of a curtain system 200 (e.g., see FIGS. 2-4) disclosed herein. The aircraft 104 may include a fuselage 106 having a nose 110 at a forward end and an empennage 112 at an aft end and a longitudinal axis 108 extending between the nose 110 and the empennage 112. The empennage 112 may include a vertical tail 124 and one or more horizontal tails 122. In addition, the aircraft 104 may include a pair of wings 118 extending outwardly from the fuselage 106. One or more propulsion units 120 may be included with the aircraft 104. For example, the propulsion units 120 may be supported on the wings 118.

Figure 2:
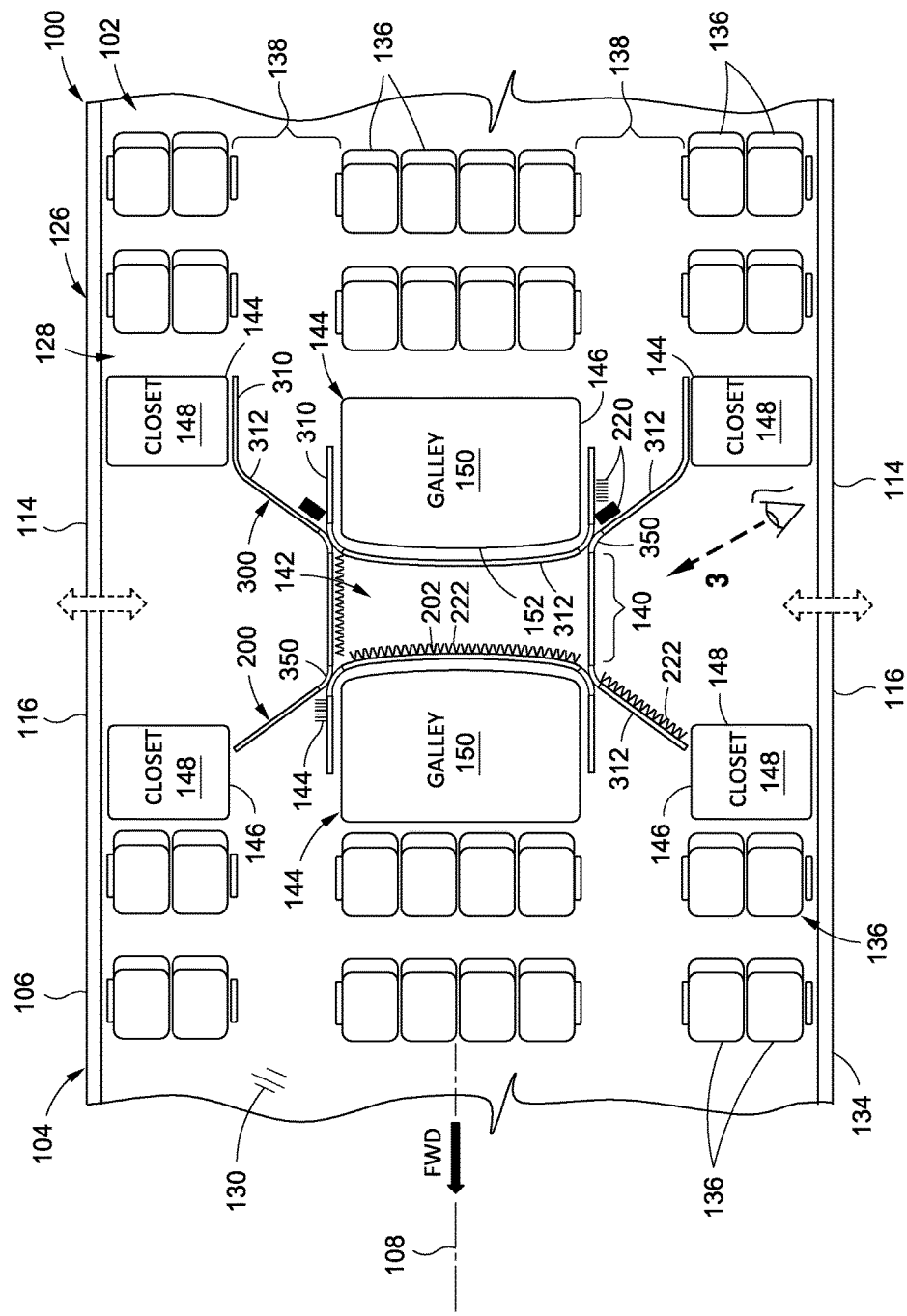
FIG. 2 is a magnified plan view of a portion of the aircraft cabin taken along line 2 of FIG. 1.

FIG. 2 is a plan view of a portion of the aircraft cabin 126 of FIG. 1. The aircraft cabin 126 may be bounded by cabin sidewalls 134 and may include passenger seating 136 which may be coupled to the cabin floor 130. The passenger seating 136 may be arranged in columns and may be divided by one or more main aisles 138 extending generally parallel to the longitudinal axis 108 of the aircraft 104. The aircraft cabin 126 may include different seating arrangements at different locations along the length of the aircraft cabin 126. A galley section may divide the passenger seating 136 into different seating classes such as business class and economy class. The galley section may include one or more galley 150 monuments 144 which may be separated by a cross aisle 140. In the example shown, the cross aisle 140 may be generally aligned with an exit 114 door 116 on one or both sides of the aircraft cabin 126. The aircraft cabin 126 may further include one or more monuments 144 on one or both sides of the door aisles. The monument 144 may be a galley 150, a lavatory, or a closet 148 for storing items of clothing or luggage, and may optionally be configured to support one or more fold-down seats for the flight attendants.

In FIG. 2, the aircraft cabin 126 may further include one or more curtain systems 200 as disclosed herein. The curtain system 200 includes an integrated track system 300 mounted to the interior structure 128 of the aircraft cabin 126 and which allows for multiple-use of curtains 202 at different locations along the track system 300. In this regard, the curtain system 200 allows for curtain arrangements in multiple embodiments such as in a main aisle 138, a cross aisle 140, and/or a galley section of an aircraft cabin 126. The track system 300 includes a series of track sections 302 which may include longitudinal track sections 310 and transverse track sections 312 and which may be interconnected by junction fittings 350 that allow for selective deployment of one or more curtains 202 across one or more main aisles 138, across a galley aisle 142 (e.g., a cross aisle 140), or in any other location. Furthermore, the curtain system 200 allows for a mix of full-length curtains 224 and partial-length curtains 226 at different locations along the track system 300 to accommodate different modes of operation of the aircraft 104, as described in greater detail below.

Figure 3:
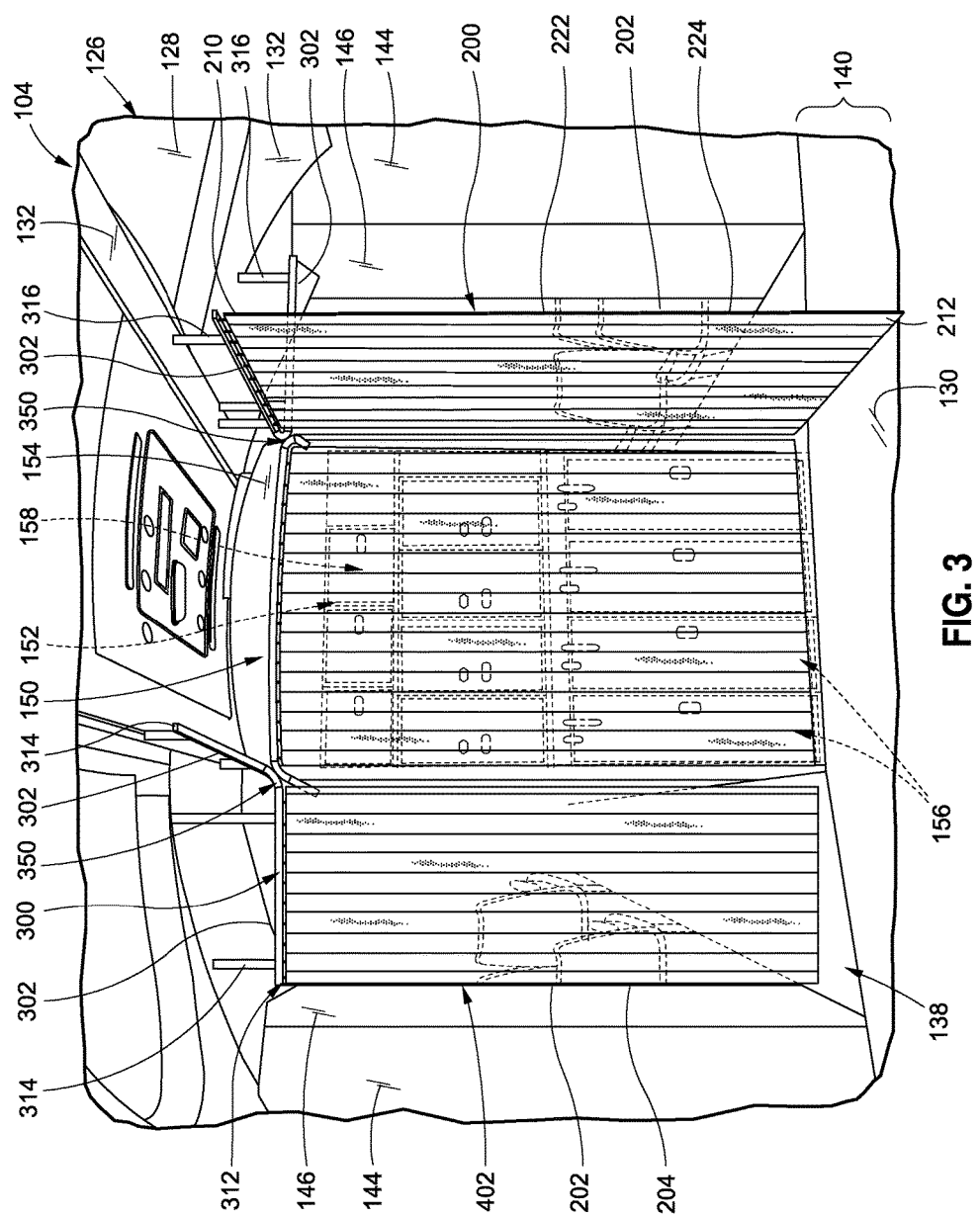
FIG. 3 is a perspective view of a galley of the aircraft cabin taken along line 3 of FIG. 2 and showing an example of a curtain system incorporating a track system having a junction fitting for networking a plurality of track sections of the track system.

FIG. 3 illustrates an example of a curtain system 200 installed in the galley section of the aircraft cabin 126. The curtain system 200 includes a track system 300 mounted to the interior structure 128 of the aircraft cabin 126. The track system 300 may be mounted to a monument 144, a cabin ceiling 132, or other hard points in the aircraft cabin 126. For example, one or more track supports 314 may secure the track sections 302 to one or more monument sidewalls 146 such as a galley header 154, a galley side wall, a closet side wall, or other hard point. The track sections 302 may also be suspended from one or more track supports 314 (e.g., support rods 316) extending downwardly from the cabin ceiling 132. In addition, the junction fittings 350 may be supported using one or more track supports 314.

The track system 300 may include three or more track sections 302 oriented in at least two different directions and interconnected by a junction fitting 350. Each track section 302 may be configured to support at least one curtain 202. In FIG. 3, the curtain system 200 includes full-length curtains 224 shown in a deployed configuration 222. One of the full-length curtains 224 extends across one of the main aisles 138 to act as a partition such as between different seating classes of the aircraft cabin 126. Another full-length curtain 224 is shown extending across the galley working face 152, and another full-length curtain 224 extends across the cross aisle 140 at one end of the galley section. The curtains 202 are suspended from the track sections 302 which may also be configured to allow for sliding movement of the curtain 202.

Figure 4:
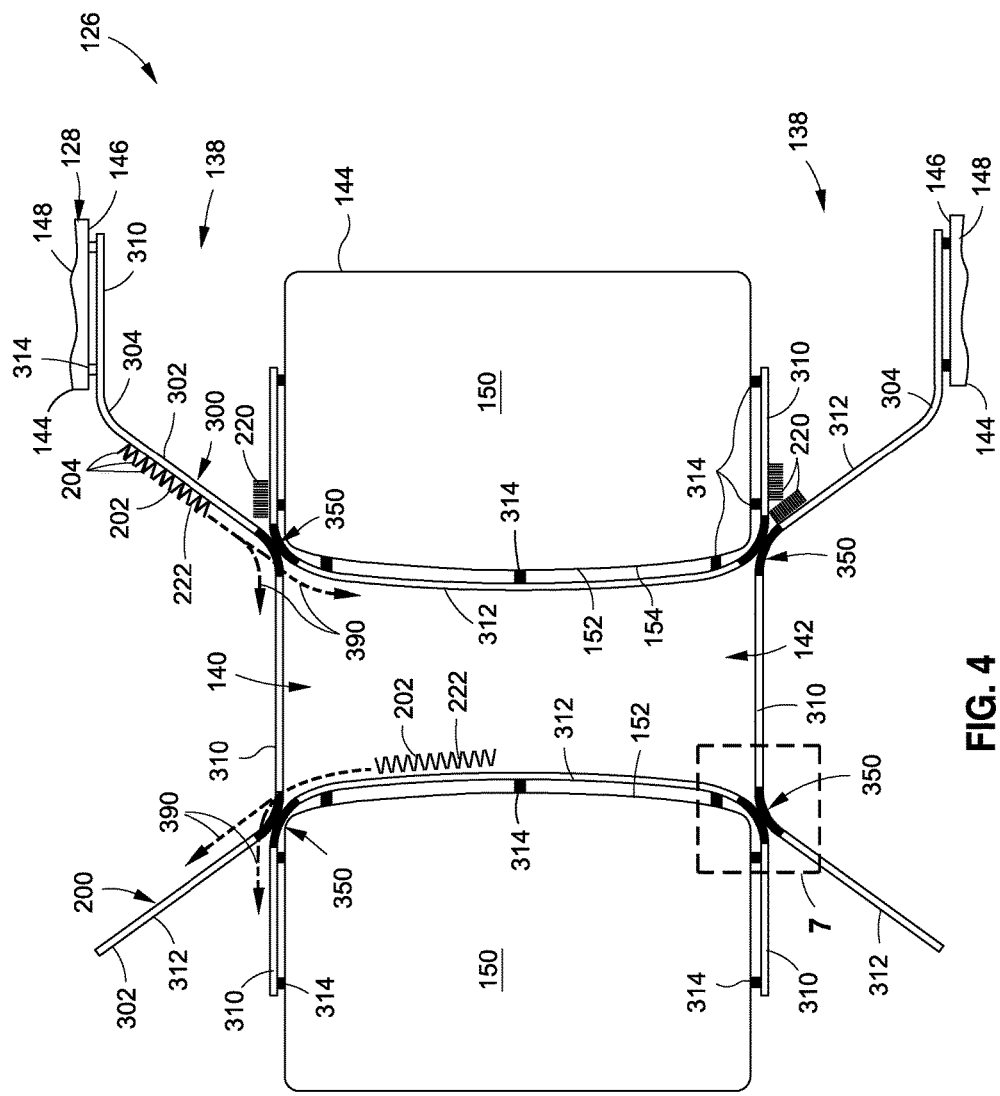
FIG. 4 is a plan view of an example of a track system showing a plurality of track sections interconnected by junction fittings.

FIG. 4 is a plan view of an example of a track system 300 showing a plurality of track sections 302 interconnected by junction fittings 350. In one example, each junction fitting 350 may interconnect three or more track sections 302. The track sections 302 may be curved, straight, or a combination of curved and straight. In FIG. 4, the track system 300 includes a transverse track section 312 having a curved shape generally matching the curved shape of the galley 150 to which the transverse track section 312 is mounted. In addition, the track system 300 includes transverse track sections 312 oriented non-parallel to the main aisles 138 and extending at least partially across the main aisle 138. Although shown oriented at a non-perpendicular angle relative to the longitudinal axis 108 of the aircraft 104, the transverse track sections 312 may be oriented perpendicular to the longitudinal axis 108.

Referring still to FIG. 4, the track system 300 may further include one or more longitudinal track sections 310. In some examples, the longitudinal track sections 310 may be oriented parallel to the main aisle 138. The longitudinal track sections 310 may extend at least partially across a cross aisle 140 which may be oriented non-parallel (e.g., perpendicular) to the main aisle 138. For example, FIG. 4 illustrates a longitudinal track section 310 extending between a pair of junction fittings 350 on both ends of the galley section. In addition, FIG. 4 illustrates a longitudinal track section 310 mounted to each one of the galley 150 side walls and a longitudinal track section 310 mounted to a monument sidewall 146 on a side of the main aisle 138 opposite the galley section. The track system 300 may include a curved section connector 304 connecting a longitudinal track section 310 with a transverse track section 312.

In FIG. 4, the junction fittings 350 may allow for movement of a curtain 202 from at least one of the three or more track sections 302 to either one of two or more other track sections 302 of the three or more track sections 302 interconnected by the junction fitting 350. In this regard, the junction fitting 350 and the track sections 302 define different curtain paths 390 for one or more curtains 202. The track sections 302 may generally lie in the same plane (e.g., a horizontal plane) and may be oriented in different directions within the plane. However, although not shown, one or more of the track sections 302 may be oriented in angled relation to the plane of the other track sections 302 in addition to being oriented in a different directions when the track system 300 is viewed in plan view. Although the presently-disclosed curtain system 200 and method is described in the context of a galley 150 of an aircraft cabin 126 having a cross aisle 140 extending through the galley 150, the curtain system 200 may be implemented in other areas of the aircraft cabin 126.

FIG. 5 shows an example of a curtain 202 in an expanded or deployed configuration 222 supported along a curtain upper edge 210 from a track section 302. The curtain 202 may include one or more hanger elements 376 for suspending the curtain 202 from the track section 302. A curtain 202 may be provided in a width sized to extend across at least one aisle when the curtain 202 is in a deployed configuration 222. For example, a curtain 202 in a deployed configuration 222 may have a width extending across an entirety of the main aisle 138 as shown in FIG. 3. A curtain 202 may also be provided in a deployed configuration 222 having a width extending across an entirety of a cross aisle 140 as also shown in FIG. 3. In some examples, the curtains 202 may be provided with vertical pleats 204 extending from a curtain upper edge 210 to a curtain lower edge 212.

FIG. 6 shows an example of a curtain 202 in a stowed configuration 220. The pleats 204 may provide a means for folding the curtain material at regularly spaced intervals into the stowed configuration 220. In the stowed configuration 220, the plurality of pleats 204 may be folded together in a stacked arrangement. In some examples, the curtain upper edge 210 at two or more pleats 204 or two or more of the hanger elements 376 may include a magnet (not shown) to magnetically couple the pleats 204 together to retain the curtain 202 in the stowed configuration 220. In this regard, the magnets may be configured to be attracted to one another or attracted to magnetically-attractive material (not shown) that may be included in one or more of the pleats 204.

Figure 15:
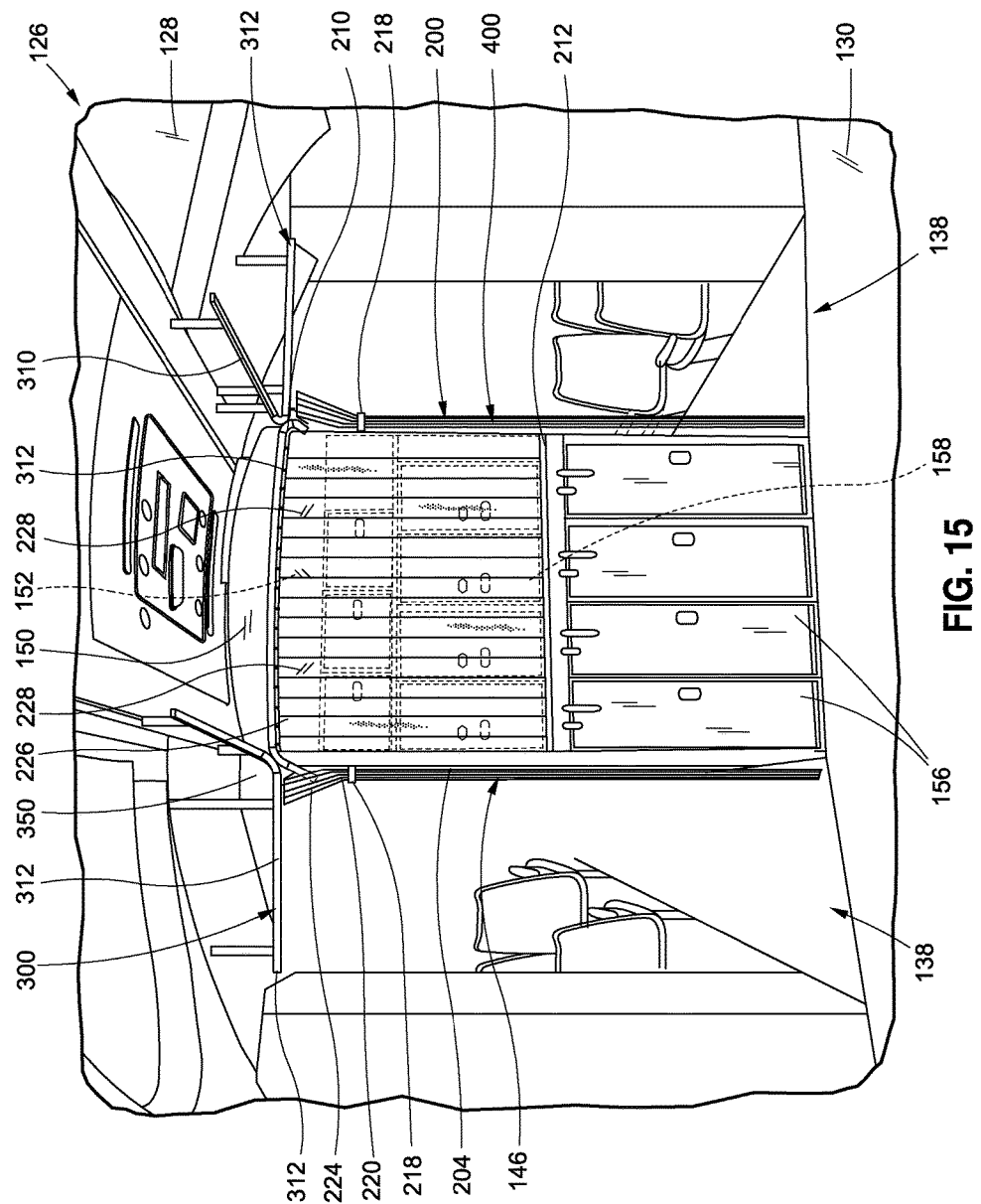
FIG. 15 is a perspective view of an example of a curtain system configured in a boarding mode with the half-length curtains in the deployed configuration covering the galley working face and the full-length curtains moved to a stowed configuration.

The curtains 202 may be formed of a relatively flexible material such as a fabric. In some examples, the curtains 202 may be formed of a flame-resistant material. However, the curtain 202 may be formed of any one of a variety of different types of materials including, but not limited to, any metallic or non-metallic material. In some examples, a curtain 202 may be provided as a double-sided curtain having a different color, design, fabric, texture, etc., on opposing side surfaces of the curtain 202 to provide flexibility in coordinating with the design and/or color schemes of the aircraft cabin 126. In the stowed configuration 220, a curtain 202 may be secured against a monument 144 or other hard point such as by using one or more tie-back elements 218 as shown in FIG. 15, as described below.

FIG. 7 is a plan view of a portion of the track system 300 of FIG. 4 and illustrating the different curtain paths 390 defined by the track sections 302 and junction fitting 350. A junction fitting 350 may be formed as a unitary structure of a metallic or non-metallic material. For example, the junction fitting 350 may be cast or machined from a lightweight metallic material such as aluminum alloy or stainless steel or other metallic material. In other examples, the junction fitting 350 may be formed of non-metallic material such as a high-strength and high-wear-resistant material such as polyester or Nylon™ using a suitable forming process including injection molding, additive manufacturing such as stereolithography, or 3-D printing. In still further examples, the junction fitting 350 may be formed of composite material (e.g., fiber-reinforced polymer matrix material).

The junction fitting 350 may include a plurality of fitting legs 352 each terminating at a leg end 362. In the example shown, the junction fitting 350 includes four fitting legs 352 corresponding to the four track sections 302 that are interconnected by the junction fitting 350. Each fitting leg 352 may be straight or curved or a combination of straight and curved. Each track section 302 may have a section length (not shown) defined by opposing section ends 308. Each leg end 362 of a fitting leg 352 may be disposed in end-to-end relation to a section end 308 of a track section 302.

Referring still to FIG. 7, in some examples, a track section 302 may be physically coupled to a fitting leg 352 such as by adhesive bonding and/or mechanically coupling. For example, a track connector 372 may be implemented for mechanically coupling a track section 302 to a junction fitting 350 using mechanical fasteners 374 as shown in FIGS. 7-8. In a further example, a junction fitting 350 may be non-mechanically-coupled to a fitting leg 352. For example, a track section 302 may be adhesively bonded to a fitting leg 352. Even further, a junction fitting 350 may be integrally formed with one or more track sections 302 as a unitary structure. Although not shown, a junction fitting 350 may be mounted to a monument sidewall 146, a cabin ceiling 132, or other hard point using a track support (not shown) to maintain the junction fitting 350 in fixed relation to a plurality of track sections 302 interconnected by the junction fitting 350. One or more of the track sections 302 may be independently mounted to a monument sidewall 146, a cabin ceiling 132, or other hard point using one or more track supports 314.

FIG. 8 is a sectional view taken of an example of a junction fitting 350. The junction fitting 350 may have a generally hollow interior with a cross-sectional shape and configuration complementary to the sectional shape of the track sections 302. Although shown having a rectangular or square shape, the cross-section of the junction fitting (e.g., the fitting legs 352) may be provided in any shape or configuration, without limitation, including a rounded, oval, or circular cross-sectional shape. As indicated above, each track section 302 and each fitting leg 352 may include a bottom portion 364 having a slot 366 to allow curtain-supporting hanger elements 376 to extend through and slide along the length of the slot 366, as described below. The slots 366 may extend through the bottom portion 364 of the fitting leg 352 and across the leg intersections 354 of the junction fitting 350. The cross-section of the track sections 302 and junction fitting 350 may include an inner track surface 370 along which the hanger elements 376 may be supported. As shown in FIG. 7 and mentioned above, the leg ends 362 of the junction fitting 350 may be butted against the section ends 308 of the different track sections 302 to allow for seamless sliding motion of the hanger elements 376 along the inner track surfaces 370 of the junction fitting 350 and adjoining track sections 302.

Referring again to FIG. 7, the fitting legs 352 may be oriented at different leg angles 356 relative with one another. In some junction fitting 350 configurations, at least one of the fitting legs 352 may be oriented in non-perpendicular relation and in non-parallel relation to one or more of the other fitting legs 352 of the junction fitting 350. In the example shown, the junction fitting 350 may include one or more transverse fitting legs 360 which may be coupled to one or more transverse track sections 312. Likewise, the junction fitting 350 may include one or more longitudinal fitting legs 358 which may be coupled to corresponding longitudinal track sections 310. In the present example, a longitudinal fitting leg 358 may be parallel to a longitudinal axis 108 of the aircraft 104. However, a junction fitting 350 may include fitting legs 352 oriented in any direction relative to the longitudinal axis 108 of the aircraft 104.

Referring still to FIG. 7, the longitudinal fitting legs 358 may be parallel to one another and may be offset relative to one another. However, the junction fitting 350 may be provided with fitting legs 352 that are aligned with one another. In this regard, the junction fitting 350 in FIG. 7 includes a pair of transverse fitting legs 360 which are both oriented at a non-perpendicular angle relative to the longitudinal fitting legs 358. The transverse fitting legs 360 are parallel to one another and the slots 366 of the transverse fitting legs 360 are aligned with one another. The slots 366 in the longitudinal fitting legs 358 of FIG. 7 are parallel and are offset from one another. In some examples, the junction fitting 350 may include one or more curtain guides 369 as shown in FIGS. 7-8. A curtain guide 369 may comprise a ramped surface (e.g., see FIG. 7) that may extend outwardly from a sidewall of a junction fitting 350 as shown in FIG. 8. The curtain guides 369 may be fixedly coupled to or integrally-formed with the junction fitting 350. Alternatively, the curtain guides 369 may be separately formed and bonded or fastened to the junction fitting 350. Such curtain guides 369 may be configured to direct or guide the hanger elements 376 of a curtain 202 toward a curved curtain path 390. The curtain guides 369 may also allow a curtain 202 to be moved along a straight curtain path 390 once the individual hanger elements 376 of the curtain 202 move past the curtain guide 369.

Figure 9:
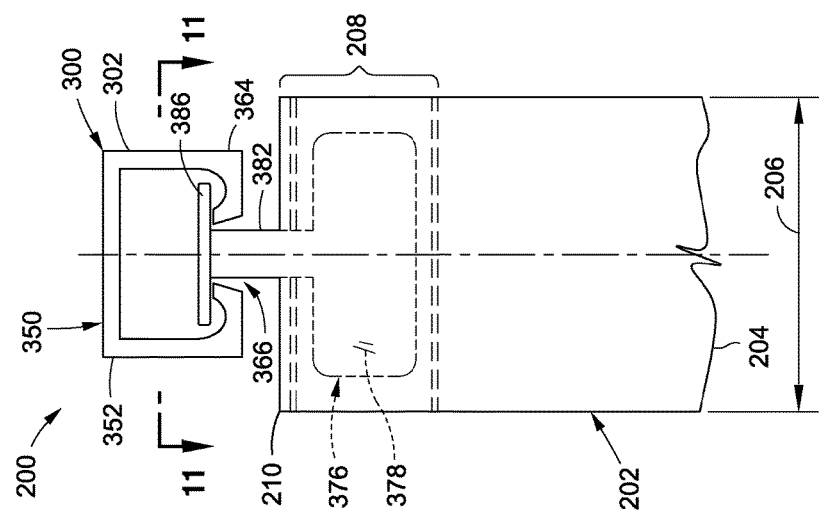
FIG. 9 is a sectional side view of an example of a curtain system including a hanger element suspending a curtain from a track section.

FIG. 9 is a sectional side view of an example of a curtain 202 coupled to a track section 302 by a hanger element 376. A hanger elements 376 may include a head portion 386 and a body portion 378. The head portion 386 may be engaged to the track section 302. For example, the head portions 386 of the hanger elements 376 may be insertable within the track sections 302 and the junction fittings 350 and may be slidable along one or more inner track surfaces 370 of the track sections 302 and the junction fittings 350. The body portion 378 may be coupled to the curtain upper edge 210. The head portion 386 and the body portion 378 may be interconnected by a neck portion 382.

Figure 10:
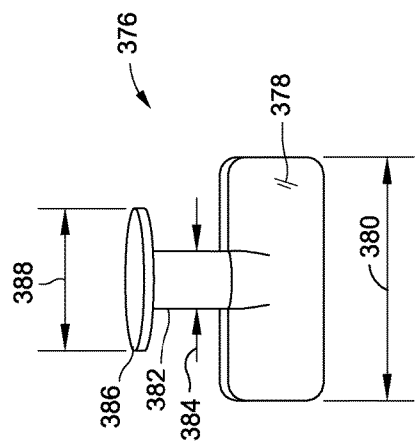
FIG. 10 is a perspective view of an example of a hanger element.

FIG. 10 is a perspective view of an example of a hanger element 376 for coupling the curtain upper edge 210 to the track section 302 and the junction fitting 350. The neck portion 382 may have a neck width 384 (e.g., neck diameter) sized and configured complementary to the slot width 368 in the junction fitting 350 (e.g., the fitting legs 352) and track sections 302. In some examples, the slot width 368 within the track sections 302 may be slightly larger than the neck width 384. In some examples, the neck portion 382 may have a cylindrical configuration. The neck width 384 may be of diameter than may be slightly less than the slot width (e.g., by 0.050 inch) to allow for slight lateral motion and/or slight side-to-side tilting motion of the hanger element 376 relative to the track section 302 and junction fitting 350 as may occur when the curtain side edge 214 is being pulled along the track section 302 or through the junction fitting 350 such as by a flight attendant.

Referring to FIGS. 9-10, the head portion 386 may have a head width 388 (e.g., a head diameter) that may be larger than the slot width 368. In this regard, the head width 388 may be larger than the span across the pair of inner track surfaces 370 located on opposite sides of the slot 366 of the track section 302 and junction fitting 350. As mentioned above, the head portion 386 may be slidably supported by the inner track surfaces 370 of the track section 302 and junction fitting 350. The body portion 378 may be attached or secured to the curtain upper edge 210 which may be hemmed and/or which may include one or more pockets (not shown) or other means for securing the body portion 378 to the curtain upper edge 210.

As shown in FIG. 10, in one example, the body portion 378 may have a generally flat planar shape having a body width 380 that is less than a pleat width 206 of the pleats 204 in the curtain 202 to allow the body portion 378 to fit within an interior of the curtain 202 such as in the hemmed portion 208. Alternatively, the body portion 378 may be configured to be coupled to an exterior (not shown) of the curtain 202 on one or both sides (e.g., via a clevis arrangement) of the curtain 202. The body portion 378, the neck portion 382, and the head portion 386 may be integrally formed as a unitary structure, or formed as two or more components fastened or attached together to form the hanger element 376. The neck portion 382 may also include a pivot point (not shown) to facilitate movement of the hanger element 376 through the track section 302 and junction fitting 350 and to permit more compact stowage of the curtain 202. The body portion 378 may be formed of a metallic and/or a non-metallic material that is compatible with the material from which the track section 302 and the junction fitting 350 are formed. In one example, the body portion 378 may be formed of a durable polymeric material such as Nylon™ or polyethylene.

Figure 11:
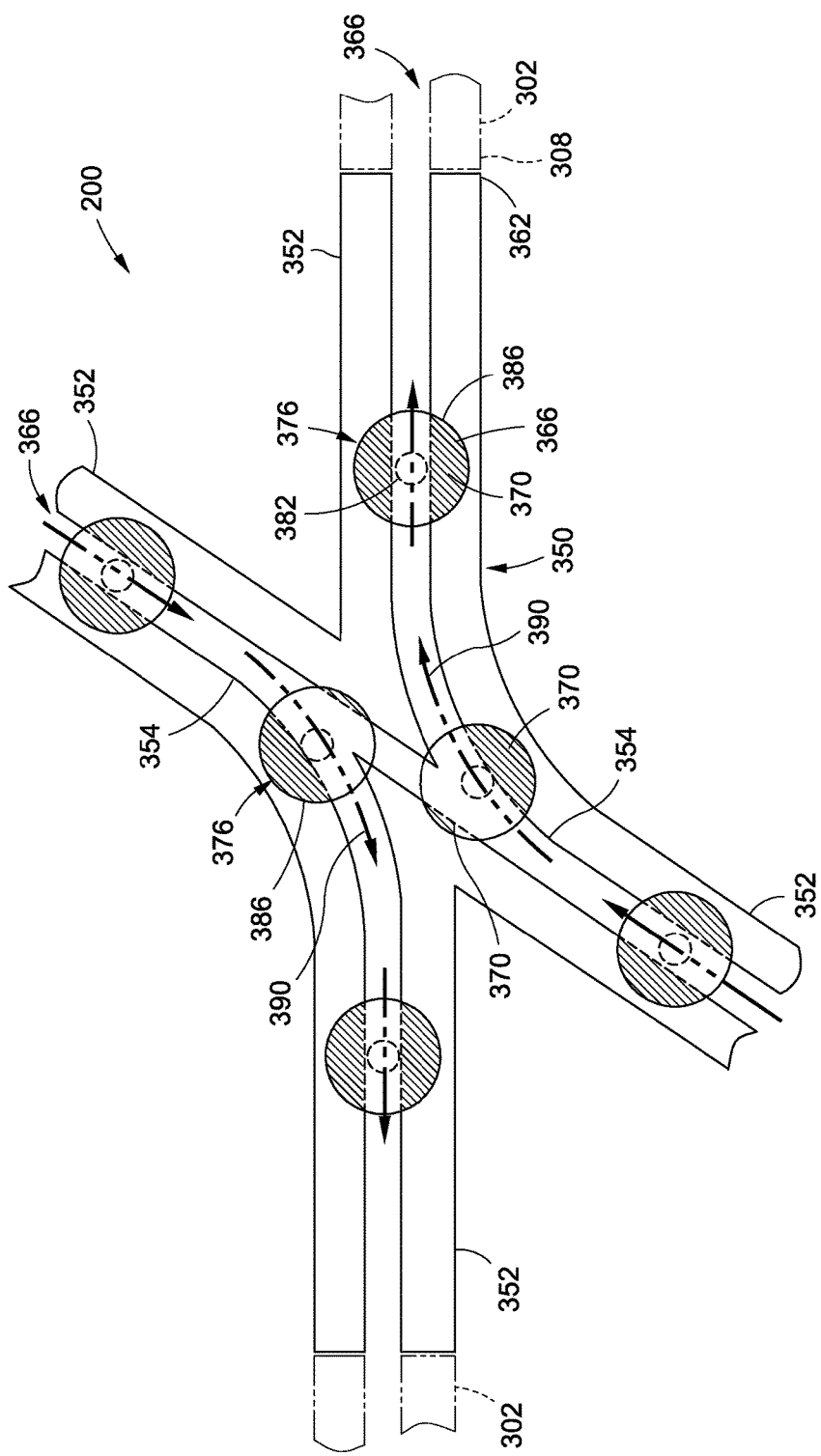
FIG. 11 is a sectional plan view of an example of a junction fitting taken along line 11 of FIG. 9 and illustrating the hanger elements supporting two different curtains in side-by-side relation to one another.

FIG. 11 is a sectional plan view of the junction fitting 350 of FIG. 9 with the curtains 202 omitted for clarity. Shown are a plurality of hanger elements 376 in spaced relation as may occur when the curtain 202 is in a deployed configuration 222 (e.g., see FIG. 5). The hanger elements 376 may support two different curtains 202 along two different curtain paths 390 defined by the junction fitting 350. In this regard, the junction fitting 350 may be configured to support two different curtains in side-by-side relation to one another on different or multiple curtain paths 390. In this regard, a junction fitting 350 may be configured to allow for two curtains 202 to pass by one another without impeding movement relative to one another. The junction fitting 350 may also provide a means for presenting either a front side or a back side of double-sided curtains (not shown) having alternate color schemes or fabric textures on the front and back side. For example, a double-sided curtain may be guided through the fitting legs 352 of a junction fitting 350 in a manner (e.g., effecting a 3-point turn through the fitting legs) such that a front side of the curtain previously facing a forward direction of the main aisle is reversed to face an aft direction of the main aisle.

In FIG. 11, advantageously, the head width 388 of the hanger elements 376 may be configured such that each one of the head portions 386 maintains contact with the inner track surfaces 370 as represented by the cross-hatched areas in FIG. 11. In this regard, both sides of each head portion 386 may maintain contact with the inner track surfaces 370 on both sides of the slot 366 at any point along the junction fitting 350. In this manner, both sides of each head portion 386 may be supported by the inner track surfaces 370 and may avoid the hanger element 376 tilting at an angle when moving through the junction fitting 350 and which may thereby prevent the head portion 386 from snagging or catching on a discontinuity in the converging slots 366 at the leg intersections 354 of the junction fitting 350.

Figure 14:
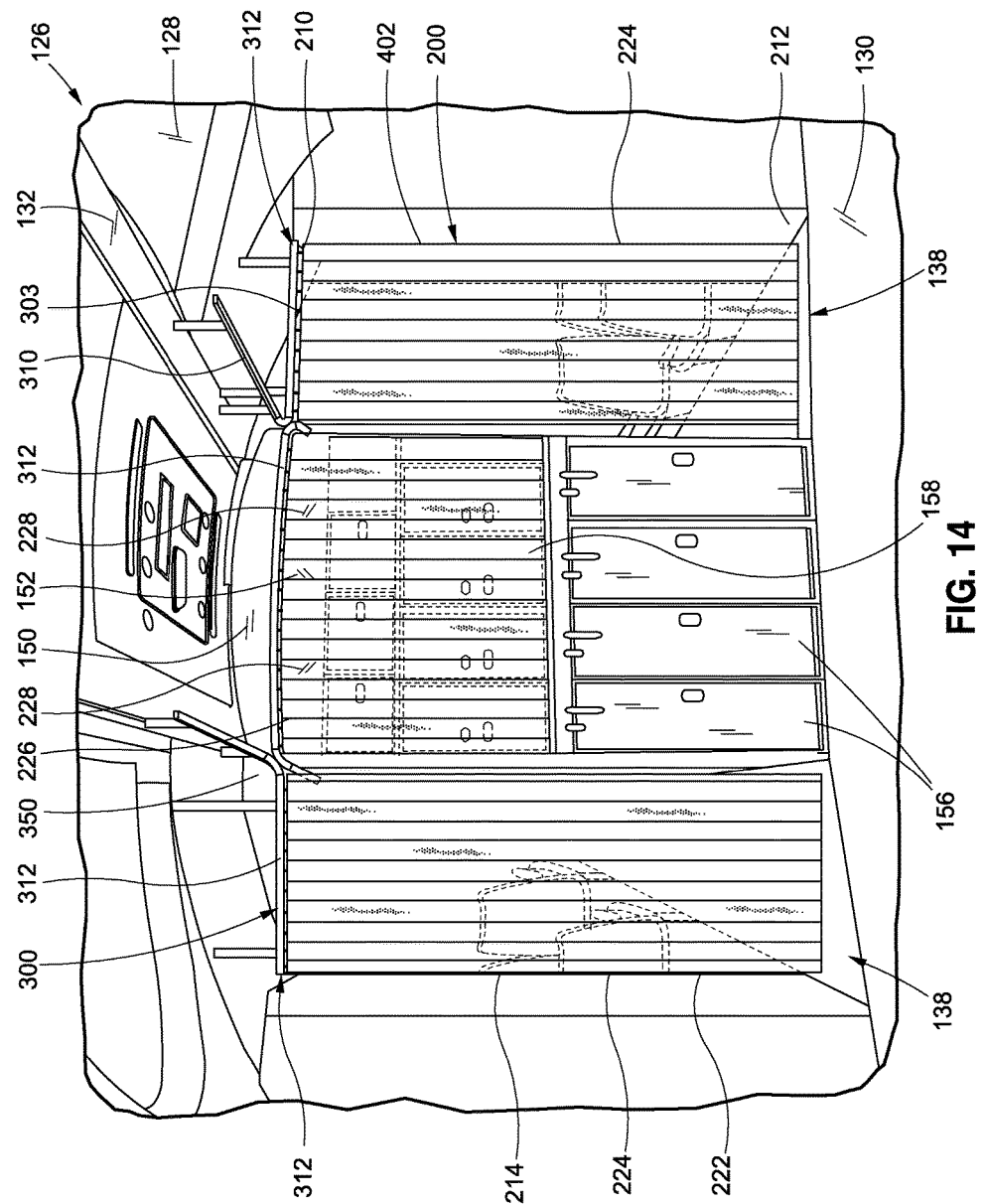
FIG. 14 is a perspective view of an example of a curtain system configured in a night mode with half-length curtains in a deployed configuration covering a galley working face and full-length curtains in a deployed configuration extending across the main aisles of an aircraft cabin.

FIG. 12 is a sectional plan view of a further example of a junction fitting 350 having multiple curtain paths 390 defined by the fitting legs 352. Although four fitting legs 352 are shown, any number may be provided. The fitting legs 352 may be oriented at any leg angle 356 relative to one another and are not limited to the perpendicular orientation shown. The junction fitting 350 in FIG. 12 allows for movement of a curtain 202 through the junction fitting 350 along one curtain path 390 from one fitting leg 352 to another fitting leg 352 without interference with another curtain 202 moving through the junction fitting 350 along a different curtain path 390, as mentioned above. In addition, the junction fitting 350 in FIG. 12 includes inner track surfaces 370 configured to support the head portions 386 of the hanger elements 376 in a manner described above with regard to FIG. 11. The junction fitting 350 may include one or more track portions 371 which may be coupled to the top wall or top portion 363 of the junction fitting 350 by one or more connecting rods 375 as shown in FIG. 14. The track portions 371 may include inner track surfaces 370 on which the hanger elements 376 may be supported.

FIG. 14 is a perspective view of an example of a curtain system 200 configured in a night mode 402 with a pair of half-length curtains 228 butted against one another in the center of the galley 150 and partially covering the galley working face 152. Also shown are a pair of full-length curtains 224 respectively extending across the pair of main aisles 138 of the aircraft cabin 126. In the present disclosure, a full-length curtain 224 may have a curtain lower edge 212 that terminates at a location of between approximately 90-100% of a height of the track sections 302 above a cabin floor 130. For example, the curtain lower edge 212 may be positioned up to several inches above the cabin floor 130. A partial-length curtain 226 (e.g., a half-length curtain 228) may have a curtain lower edge 212 that terminates at a location of between approximately 30-70% of the height of the track sections 302 above the cabin floor 130. The partial-length curtains 226 shown in FIG. 14 may be configured as half-length curtains 228 wherein the curtain lower edge 212 terminates at a location of approximately 50% of a height of the track section 302 above the cabin floor 130.

Advantageously, the partial-length curtains 226 may allow access to the lower portion of the galley working face 152 which typically houses side-by-side galley meal carts 156. The open lower portion of the galley working face 152 may allow galley meal carts 156 to be removed and docked to galley chiller ducts (not shown) such as during catering operations. The full-length curtains 224 may act as a partition between seating sections of the aircraft cabin 126. The interconnection provided by the junction fitting 350 of the transverse track sections 312 extending across the main aisle 138 and the galley working face 152 allows for the curtains to be easily moved to different track sections 302 in the track system 300.

FIG. 15 shows the curtain system 200 configured in a boarding mode 400 with the full-length curtains 224 secured in the stowed configuration 220 to unblock the main aisles 138. In the stowed configuration 220, the pleats 204 of the full-length curtains 224 may be positioned in a stacked arrangement (e.g., see FIG. 6). One or more tie-back elements 218 may be implemented for securing the stowed configuration 220 against a monument sidewall 146 such as against a galley 150 side wall. In one example, the tie-back element 218 may be configured as a strap (not shown) extending at one end from a monument sidewall 146 and passing around the curtain 202 and an opposite end of the tie-back element 218 being secured to the monument sidewall 146 or to itself by any suitable means including hook and loop fastener material (e.g., Velcro™) or other means such as a mechanical fastener, a snap, a clip, or other means. In some examples, the tie-back element 218 may include one or more magnets (not shown) to magnetically couple the tie-back element 218 to a monument sidewall 146 or other attachment point in the aircraft cabin 126. As indicated above, the half-length curtains 228 may have a length that covers the upper portion of the galley working face 152 with the lower portion of the galley working face 152 remaining open to allow for galley servicing and catering operations such as loading and unloading galley meal carts 156 in the galley cart compartments (not shown).

Figure 16:
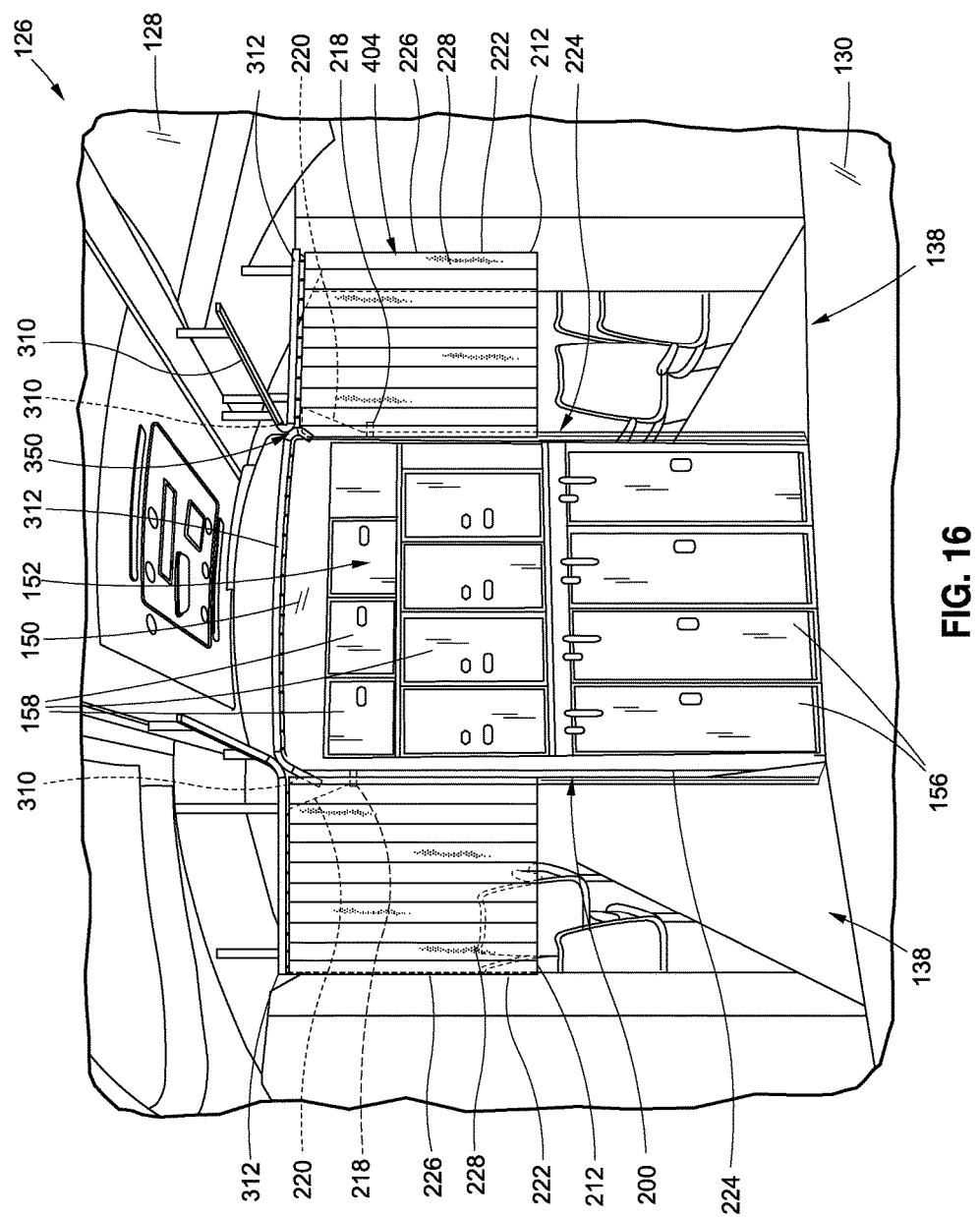
FIG. 16 is a perspective view of an example of a curtain system configured in a galley operation mode with the half-length curtains moved to the main aisles and the full-length curtains moved to the stowed configuration.

FIG. 16 shows an example of a curtain system 200 arranged in a galley operation mode 404 with full-length curtains 224 on each side of the galley 150 moved to a stowed configuration 220. Each one of the full-length curtains 224 may be moved from a transverse track section 312 extending across the main aisle 138 to a longitudinal track section 310 extending along a galley 150 side wall using one or more tie-back elements 218 to secure the full-length curtains 224 in the stowed configuration 220. The pair of half-length curtains 228 are shown moved from the galley working face 152 to the main aisles 138 which may discourage passenger movement along the main aisle 138 while allowing movement of the galley meal carts 156 along the main aisle 138 by passing the galley meal carts 156 underneath the curtain lower edge 212 of the half-length curtains 228. The galley working face 152 is shown completely open allowing access to the inserts 158 (e.g., coffeemaker, oven, freezer) which may be located in the upper portion and also allowing access to the galley meal carts 156 in the lower portion.

Figure 17:
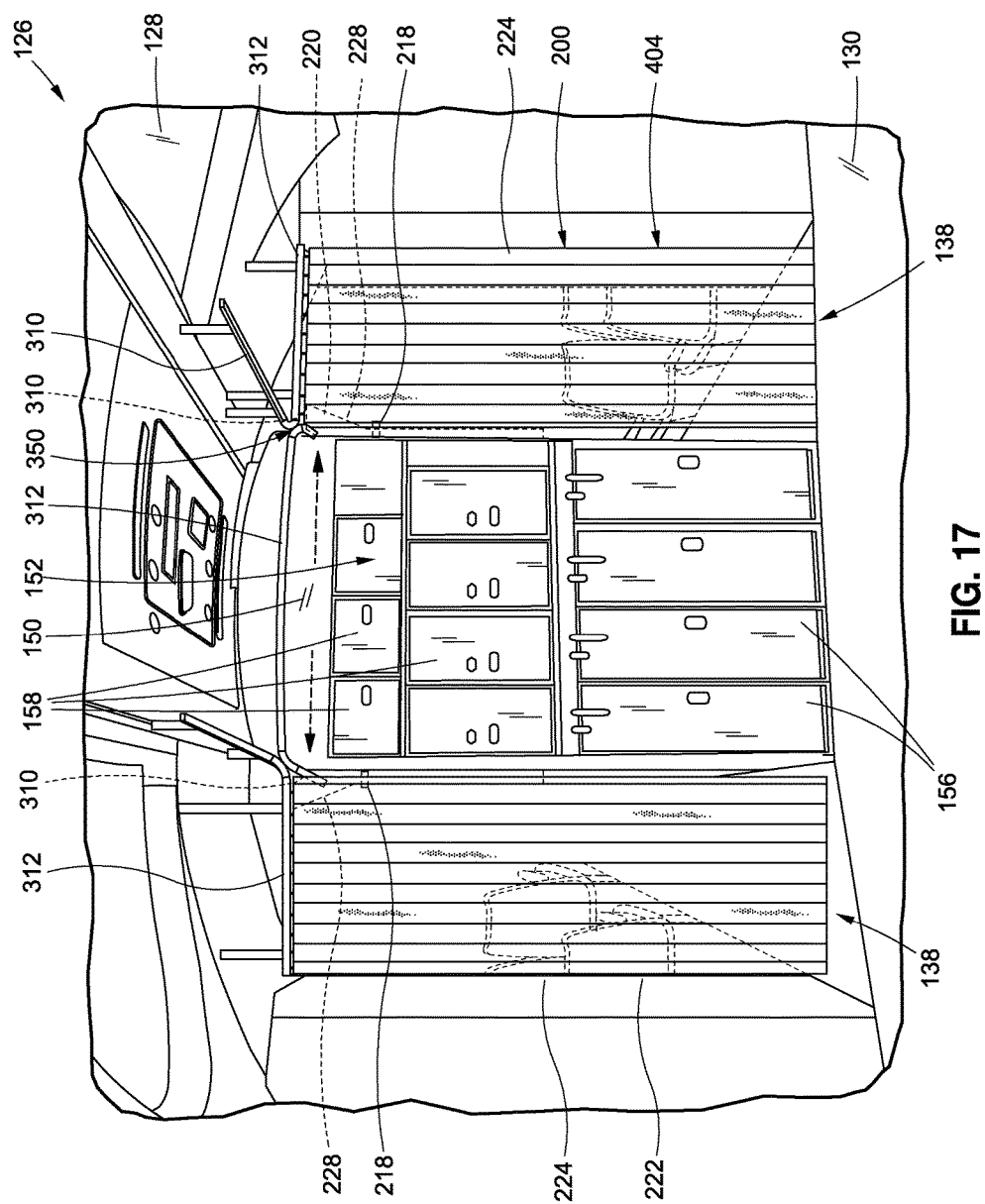
FIG. 17 is a perspective view of an example of a curtain system configured in a galley operation mode with the half-length curtains in a stowed configuration and the full-length curtains in a deployed configuration.

FIG. 17 shows a further example of the curtain system 200 arranged in a galley operation mode 404 with the half-length curtains 228 moved to the stowed configuration 220 and the full-length curtains 224 remaining in the deployed configuration 222 to discourage passenger movement along the main aisle 138 during meal preparation and/or galley operations. Each one of the half-length curtains 228 may be moved through the junction fittings 350 to a longitudinal track section 310 on each side of the galley 150. The half-length curtains 228 may be retained in the stowed configuration 220 using one or more tie-back elements 218 as described above.

Figure 18:
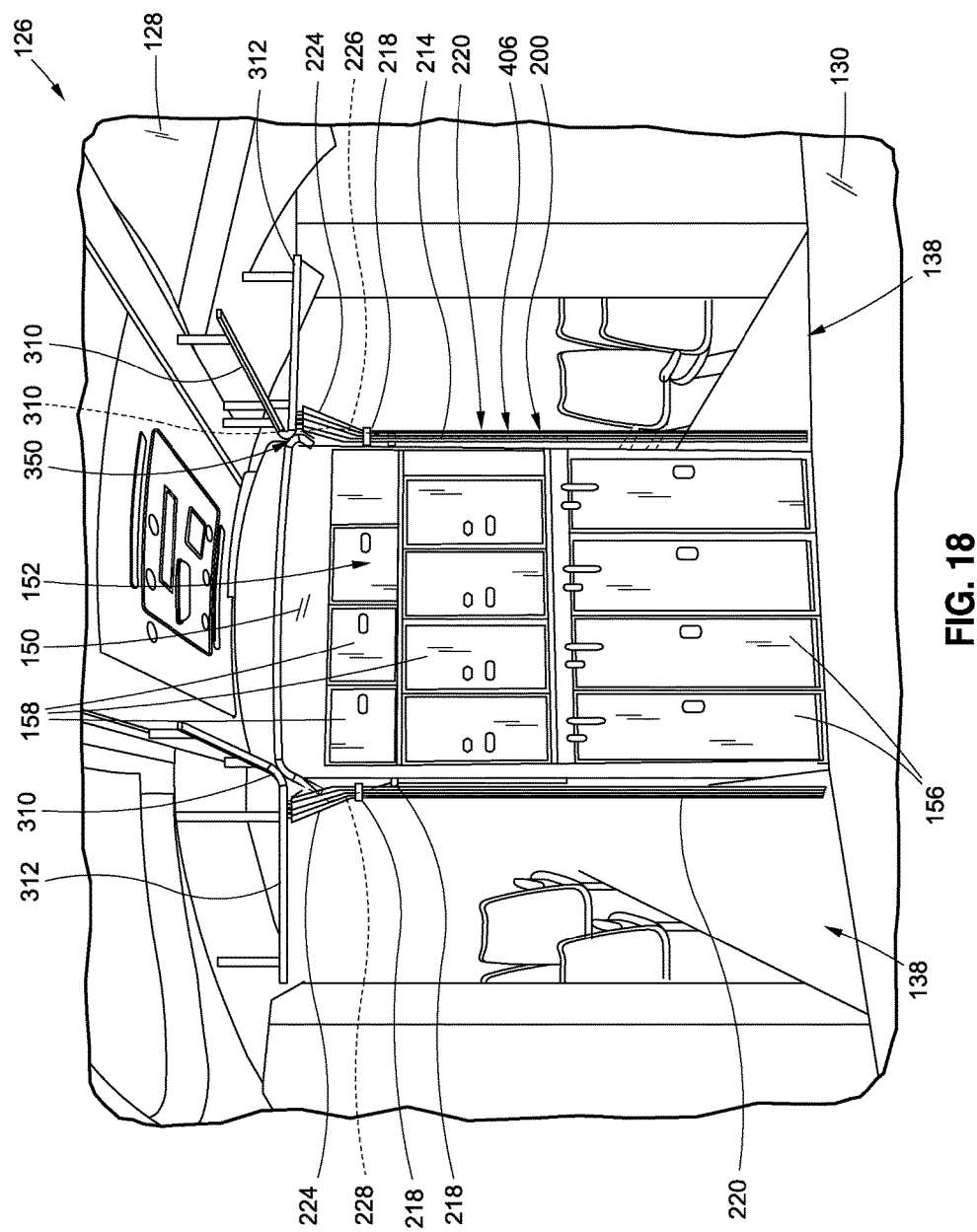
FIG. 18 is a perspective view of an example of a curtain system configured in a full open mode with the half-length curtains and full-length curtains in a stowed configuration.

FIG. 18 shows an example of a curtain system 200 arranged in a full open mode 406 with the half-length curtains 228 and the full-length curtains 224 in a stowed configuration 220. The half-length curtains 228 and the full-length curtains 224 may be secured in the stowed configuration 220 using one or more tie-back elements 218 as mentioned above.

FIG. 19 shows an example of an embodiment of a curtain 202 configured as a graduated-length curtain 230. The graduated-length curtain 230 may be made up of a partial-length portion 232 and a full-length portion 234. The graduated-length curtain 230 may be a unitary structure in the sense that the graduated-length curtain 230 is continuous in a lateral direction between the opposing curtain side edges 214. In the example shown, the graduated-length curtain 230 may include a half-length portion and a full-length portion 234. The graduated-length curtain 230 may be a singular component or the graduated-length curtain 230 may be assembled from two separate curtains which may be retained together with magnets, snaps, or other means.

FIG. 20 is a sectional view of the graduated-length curtain 230 along a curtain side edge 214 and illustrating a stiffening element 216 that may be included in the curtain side edge 214. The stiffening element 216 may be configured as a relatively stiff elongated member such as a fiberglass rod or a metallic rod that may be incorporated into a hem (not shown) along the curtain side edge 214. The stiffening element 216 may extend along at least a portion of the length (e.g., the entire length) of at least one of the curtain side edges 214, and may facilitate a user in pulling the curtain 202 along the track sections 302 and through the junction fittings 350. The stiffening element 216 may enable persons of short stature (e.g., a 5% female) to control and guide a curtain 202 along a curtain path through the junction fittings 350 and track sections 302.

FIG. 21 shows an example of a curtain system 200 including two graduated-length curtains 230 coupled to the track system 300 in the galley section of the aircraft cabin 126. In the deployed configuration 222, the graduated-length curtain 230 may span two or more track sections 302 interconnected by a junction fitting 350. In one example, the partial-length portion 232 and the full-length portion 234 may each span a transverse track section 312. As shown in FIG. 21, the full-length portion 234 of the graduated-length curtain 230 may be coupled to a main aisle 138 track section 302 extending across the width of the main aisle 138. The partial-length portion 232 of the graduated-length curtain 230 may extend across a transverse track section 312 along the galley working face 152. Although not shown, a curtain 202 may combine two full-length curtains 224 each configured to span the length of a track section 302, or a curtain 202 may combine tool partial-length curtains 226 each configured to span the length of a track section 302.

Although the presently-disclosed curtain system 200 is described in the context of an aircraft cabin 126 of a commercial aircraft 104 as shown in the figures, the curtain system 200 may be implemented in any type of commercial, civilian, and military aircraft including fixed-wing aircraft, rotary-wing aircraft and in any one of a variety of other types of air vehicles. Furthermore, the curtain system 200 and/or method 500 (FIG. 22) disclosed herein may be implemented in land-based vehicles including in motor vehicles such as trains, buses, and recreational vehicles. In addition, the curtain system 200 and/or method 500 may be implemented in any type of watercraft. In this regard, the curtain system 200 and/or method may be implemented in an interior of any type of vehicle, without limitation. The curtain system 200 and/or method 500 may also be implemented in any type of non-vehicular application including any type of building or other land-based structure.

Figure 22:
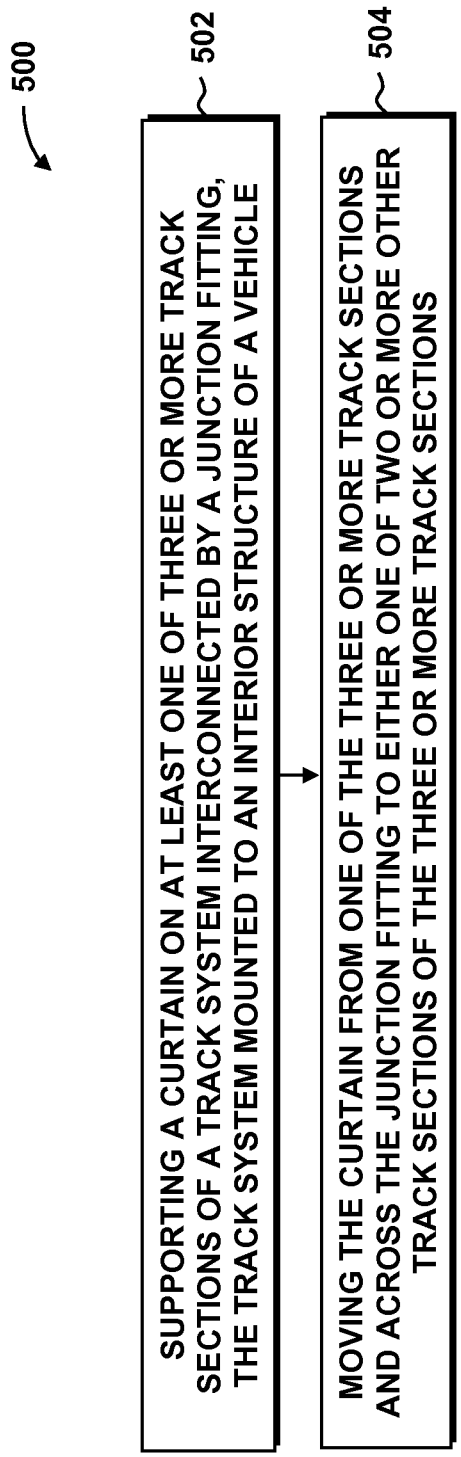
FIG. 22 is a flowchart of a method of arranging curtains in an interior of a vehicle.

FIG. 22 is a flowchart of a method 500 of arranging or positioning curtains 202 in an interior structure 128 of a vehicle 100. Step 502 of the method may include supporting a curtain 202 on at least one of three or more track sections 302 of a track system 300 interconnected by a junction fitting 350. As indicated above, the track system 300 may be mounted to an interior structure 128 of a vehicle 100, and may include one or more junction fittings 350 each having a plurality of fitting legs 352 positioned in end-to-end relation to a corresponding plurality of track sections 302. The fitting legs 352 and track sections 302 may be butted against one another to allow for seamless sliding motion of the hanger elements 376 along the inner track surfaces 370 of the junction fitting 350 and adjoining track sections 302.

The step of supporting one or more curtains 202 may include supporting, on a junction fitting 350, two separate curtains 202 in side-by-side relation to one another, as shown in FIG. 11 and described above. For example, two curtains 202 supported by a junction fitting 350 may be moving along two different curtain paths 390. Advantageously, the junction fitting 350 may be configured such that two curtains 202 may be supported in static side-by-side relation or the two curtains 202 may pass in side-by-side relation to one another on two different curtain paths 390 with impeding the movement of one another.

Step 504 of the method 500 may include moving the curtain 202 from one of the three or more track sections 302 and across the junction fitting 350 to either one of two or more other track sections 302 of the three or more track sections 302. The step of moving the curtain 202 may include moving a curtain 202 along fitting legs 352 which may be located on opposite sides of the junction fitting 350. Some of the fitting legs 352 of a junction fitting 350 may be oriented in non-parallel relation to one another as shown in FIG. 7. However, junction fittings 350 may be provided in embodiments wherein at least some of the fitting legs 352 are parallel to one another and/or are aligned with one another.

In examples wherein the aircraft cabin 126 has at least one main aisle 138, the step of moving the curtain 202 may include moving the curtain 202 between a longitudinal track section 310 oriented generally parallel to the main aisle 138 and a transverse track section 312 oriented non-parallel to the main aisle 138. A main aisle 138 may be oriented generally parallel to the longitudinal axis 108 of the aircraft 104. As mentioned above and shown in FIG. 7, a longitudinal track section 310 and a transverse track section 312 may be interconnected by a junction fitting 350.

In other examples, the step of moving the curtain 202 may include moving a full-length curtain 224 along a transverse track section 312 such that the full-length curtain 224 extends at least partially across a main aisle 138. In examples wherein the aircraft cabin 126 has a main aisle 138 as shown in FIG. 4, a cross aisle 140 oriented non-parallel to the main aisle 138, and a galley 150 having a galley working face 152, the step of moving the curtain 202 may include moving the curtain 202 from a transverse track section 312 extending generally parallel to the galley working face 152 to either a longitudinal track section 310 oriented generally parallel to the main aisle 138 or to a transverse track section 312 oriented non-parallel to the main aisle 138.

The method 500 may further include at least partially covering the galley working face 152 with a partial-length curtain 226 as shown in FIGS. 14-15. As indicated above, a partial-length curtain 226 may be configured as a half-length curtain 228 having a curtain lower edge 212 terminating at a location approximately 50% of the height of the track sections 302 above the floor of the vehicle 100. The half-length curtain 228 may cover the upper portion of the galley working face 152 and may leave the lower portion of the galley working face 152 open to allow access to one or more galley meal carts 156 such as during galley servicing operations and/or during passenger boarding. In a further example, the method may include moving one or more curtain 202 along a transverse track section 312 extending at least partially across the main aisle 138. For example, FIG. 16 illustrates the movement of the half-length curtains 228 along the transverse track section 312 parallel to the galley working face 152 over to the transverse track section 312 extending over the main aisles 138 of the aircraft cabin 126 as may be implemented during a galley operation mode 404.

As may be appreciated, the curtain system 200 and method disclosed herein allows for positioning curtains in different locations along the track system 300. In addition, the curtain system 200 provides a means for rapidly and conveniently reconfiguring the curtain 202 arrangement of an aircraft cabin 126 according to different aircraft 104 operations including, but not limited to, passenger boarding mode 400, galley operations mode, nighttime mode, and other modes of aircraft 104 operation. The curtain system 200 advantageously includes a track system 300 having one or more junction fittings 350 that interconnect a network of track sections 302 including longitudinal track sections 310 and transverse track sections 312. The junction fitting 350 facilitate moving a curtain 202 along any one of a variety of curtain paths 390 such that a curtain 202 may be moved to any one of a variety of different locations on the track system 300.

Figure 23:
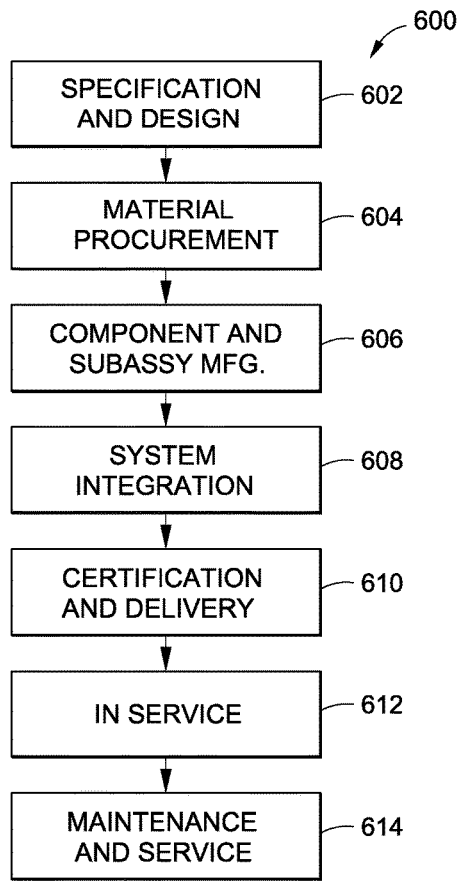
FIG. 23 is an illustration of a flow diagram of an aircraft production and service methodology.
Figure 24:
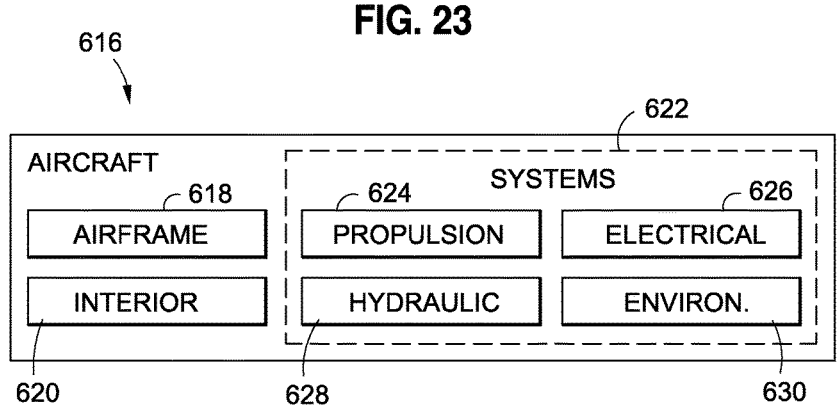
FIG. 24 is an illustration of a block diagram of an aircraft.

Referring to FIG. 23, embodiments of the present disclosure may be described in the context of an aircraft manufacturing and service method 600 as shown in FIG. 23 and an aircraft 616 as shown in FIG. 24. During pre-production, exemplary method 600 may include specification and design 602 of the aircraft and material procurement 604. During production, component and subassembly manufacturing 606 and system integration 608 of the aircraft 616 takes place. Thereafter, the aircraft 616 may go through certification and delivery 610 in order to be placed in service 612. While in service 612 by a customer, the aircraft 616 is scheduled for routine maintenance and service 614 (which may also include modification, reconfiguration, refurbishment, and so on).

Each of the processes of method 600 may be performed or carried out by a system integrator, a third party, and/or an operator (e.g., a customer). For the purposes of this description, a system integrator may include, without limitation, any number of aircraft manufacturers and major-system subcontractors. A third party may include without limitation any number of venders, subcontractors, and suppliers. An operator may be an airline, a leasing company, a military entity, a service organization, and so on.

As shown in FIG. 24, the aircraft 616 produced by exemplary method may include an airframe 618 with a plurality of high-level systems 622 and an interior 620. Examples of high-level systems 622 include one or more of a propulsion system 624, an electrical system 626, a hydraulic system 628, and an environmental system 630. Any number of other systems may be included. The presently-disclosed curtain system 200 may be implemented (e.g., installed) during production, component and/or subassembly manufacturing 606 of the aircraft 616 and/or during system integration 608 of the aircraft 616. For example, the curtain system 200 may be included in the manufacturing and/or assembly of the airframe 618 such as the interior of the aircraft cabin 126. Although an aerospace example is shown, the principles of the disclosure may be applied to other industries, such as the automotive industry, as indicated above.

Apparatus and methods embodied herein may be employed during any one or more of the stages of the production and service method 600. For example, components or subassemblies corresponding to a production process may be fabricated or manufactured in a manner similar to components or subassemblies produced while the aircraft 616 is in service. Also, one or more apparatus embodiments, method embodiments, or a combination thereof may be utilized during the production stages and, for example, by substantially expediting assembly of or reducing the cost of an aircraft 616. Similarly, one or more of apparatus embodiments, method embodiments, or a combination thereof may be utilized while the aircraft 616 is in service, for example and without limitation, in maintenance and service 614.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A curtain system for a vehicle interior, comprising:
a track system configured to be mounted to an interior structure of a vehicle and including:
four or more track sections oriented in at least two different directions;
a junction fitting having a plurality of fitting legs including a pair of transverse fitting legs and a pair of longitudinal fitting legs;
each one of the fittings legs having a slot in a bottom portion of the fitting leg for slidably receiving hanger elements configured to support at least one curtain;
the transverse fitting legs and the longitudinal fitting legs interconnecting the four or more track sections and allowing movement via the slots, of the curtain from one of the four or more track sections to any one of three or more other track sections of the four or more track sections;
the slots in the transverse fitting legs being parallel and aligned with each other and directly interconnected by a straight slot formed in the junction fitting and extending between the slots in the transverse fitting legs to thereby allow the curtain to be moved along a straight curtain path defined by the straight slot and the slots in the pair of transverse fitting legs;
the slot in each one of the transverse fitting legs being interconnected to the slot in one of the longitudinal fitting legs by a curved slot formed in the junction fitting to thereby allow the curtain to be moved along one of two curved curtain paths each defined by a curved slot, a transverse fitting leg, and a longitudinal fitting leg.

2. The curtain system of claim 1, wherein:
the junction fitting is configured to support two separate curtains in side-by-side relation to one another.

3. The curtain system of claim 1, wherein:
at least one of the track sections has opposing section ends;
each one of the fitting legs terminating at a leg end; and
at least one of the leg ends being disposed in end-to-end relation to a section end of a track section.

4. The curtain system of claim 1, further including:
a plurality of hanger elements coupling a curtain upper edge of the curtain to one or more of the track sections and the junction fitting.

5. The curtain system of claim 4, further including:
the hanger elements having a head portion and a body portion;
the head portion being engaged to and slidable along the track sections and the junction fitting; and
the body portion configured to extend through the slots in the junction fitting and being coupled to the curtain upper edge.

6. The curtain system of claim 1, further including:
a curtain configured as a graduated-length curtain having a partial-length portion and a full-length portion.

7. The curtain system of claim 6, wherein:
the graduated-length curtain is configured to span two or more track sections interconnected by the junction fitting such that the partial-length portion and the full-length portion each span one of the track sections.

8. An aircraft, comprising:
a fuselage having an aircraft cabin including an interior structure;
at least one curtain;
a track system mounted to the interior structure and including:
four or more track sections oriented in at least two different directions;
a junction fitting having a plurality of fitting legs including a pair of transverse fitting legs and a pair of longitudinal fitting legs;
each one of the fittings legs having a slot in a bottom portion of the fitting leg for slidably receiving hanger elements configured to support at least one curtain;
the transverse fitting legs and the longitudinal fitting legs interconnecting the four or more track sections and allowing movement via the slots, of the curtain from one of the four or more track sections to any one of three or more other track sections of the four or more track sections;
the slots in the transverse fitting legs being parallel and aligned with each other and directly interconnected by a straight slot formed in the junction fitting and extending between the slots in the transverse fitting legs to thereby allow the curtain to be moved along a straight curtain path defined by the straight slot and the slots in the pair of transverse fitting legs;
the slot in each one of the transverse fitting legs being interconnected to the slot in one of the longitudinal fitting legs by a curved slot formed in the junction fitting to thereby allow the curtain to be moved along one of two curved curtain paths each defined by a curved slot, a transverse fitting leg, and a longitudinal fitting leg.

9. A method of arranging curtains in a vehicle interior, comprising:
supporting at least one curtain on at least one of four or more track sections of a track system interconnected by a junction fitting, the track system mounted to an interior structure of a vehicle; the junction fitting including:
a plurality of fitting legs including a pair of transverse fitting legs and a pair of longitudinal fitting legs;
each one of the fittings legs having a slot in a bottom portion of the fitting leg for slidably receiving hanger elements configured to support the at least one curtain;
the transverse fitting legs and the longitudinal fitting legs interconnecting the four or more track sections and allowing movement via the slots, of the at least one curtain from one of the four or more track sections to any one of three or more other track sections of the four or more track sections;
the slots in the transverse fitting legs being parallel and aligned with each other and directly interconnected by a straight slot formed in the junction fitting and extending between the slots in the transverse fitting legs to thereby allow the at least one curtain to be moved along a straight curtain path defined by the straight slot and the slots in the pair of transverse fitting legs;
the slot in each one of the transverse fitting legs being interconnected to the slot in one of the longitudinal fitting legs by a curved slot formed in the junction fitting to thereby allow the at least one curtain to be moved along one of two curved curtain paths each defined by a curved slot, a transverse fitting leg, and a longitudinal fitting leg; and
moving the curtain from one of the four or more track sections and across the junction fitting to either one of three or more other track sections of the four or more track sections.

10. The method of claim 9, wherein:
at least one of the track sections has opposing section ends;
each one of the fitting legs terminating at a leg end; and
at least one of the leg ends being disposed in end-to-end relation to a section end of a track section.

11. The method of claim 9, wherein the step of moving the at least one curtain includes:
moving the at least one curtain along a pair of the fitting legs located on opposite sides of the junction fitting, the fitting legs being oriented in non-parallel relation to one another.

12. The method of claim 9, wherein the step of supporting the at least one curtain includes:
supporting, using the junction fitting, two separate curtains in side-by-side relation to one another.

13. The method of claim 9, wherein the step of moving the at least one curtain includes:
moving one of a full-length curtain and a half-length curtain along one of a transverse track section and a longitudinal track section.

14. The method of claim 9, wherein the vehicle has a main aisle, the step of moving the at least one curtain includes:
moving the at least one curtain between a longitudinal track section oriented generally parallel to the main aisle and a transverse track section oriented non-parallel to the main aisle; and
the longitudinal track section and the transverse track section being interconnected by the junction fitting.

15. The method of claim 14, wherein the step of moving the at least one curtain includes:
moving the at least one curtain such that the curtain extends at least partially across a main aisle of the vehicle.

16. The method of claim 9, wherein the vehicle has a main aisle and a cross aisle oriented non-parallel to the main aisle and including a galley having a galley working face, the step of moving the curtain includes:
moving the at least one curtain between a transverse track section extending generally parallel to the galley working face and either one of a longitudinal track section oriented generally parallel to the main aisle and a transverse track section oriented non-parallel to the main aisle; and the longitudinal track section and the transverse track sections being interconnected by the junction fitting.

17. The method of claim 9, wherein the vehicle includes a galley, the step of moving the at least one curtain includes:

at least partially covering a galley working face with a partial-length curtain; and the partial-length curtain having a curtain lower edge terminating at a location approximately 30-70% of a height of the track sections above a floor of the vehicle.

18. The curtain system of claim 8, wherein:

the aircraft has a cabin ceiling; and at least a portion of the track system is suspended from one or more track supports extending downwardly from the cabin ceiling.

19. The curtain system of claim 8, wherein:

the aircraft has a main aisle;

at least one of the track sections is a transverse track section oriented non-parallel to the main aisle.

20. The curtain system of claim 8, further including:

the aircraft has a floor;

a curtain configured as one of a full-length curtain and a partial-length curtain;

the full-length curtain having a curtain lower edge terminating at a location of between approximately 90-100% of a height of the track sections above the floor; and the partial-length curtain having a curtain lower edge terminating at a location between approximately 30-70% of a height of the track sections above the floor.

* * * * *